US012783437B2

(12) United States Patent
Månsson et al.

(10) Patent No.: US 12,783,437 B2
(45) Date of Patent: Nov. 3, 2026

(54) PRODUCER, CONSUMER, SYSTEM AND METHODS FOR INPUTTING AND OUTPUTTING DATA ITEMS INTO AND OUT FROM A RING BUFFER

(71) Applicant: Telefonaktiebolaget LM Ericsson (publ), Stockholm (SE)

(72) Inventors: Staffan Månsson, Åkarp (SE); Rickard Evertsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 18/695,387

(22) PCT Filed: Oct. 18, 2021

(86) PCT No.: PCT/EP2021/078843
§ 371 (c)(1),
(2) Date: Mar. 26, 2024

(87) PCT Pub. No.: WO2023/066454
PCT Pub. Date: Apr. 27, 2023

(65) Prior Publication Data
US 2025/0004959 A1 Jan. 2, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS 6,304,924 B1 * 10/2001 Varma .................... G06F 8/458 710/52
6,697,927 B2 * 2/2004 Bonola .................... G06F 5/10 710/21

(Continued)

FOREIGN PATENT DOCUMENTS

GB 2581836 A 9/2020

OTHER PUBLICATIONS

"AMD64 Architecture Programmer's Manual vol. 3: General-Purpose and System Instructions", AMD64 Technology, Publication No. 24594 Revision 3.32, Mar. 2021, pp. 1-684.

(Continued)

*Primary Examiner* — Elias Mamo
(74) *Attorney, Agent, or Firm* — Murphy, Bilak & Homiller, PLLC

(57) ABSTRACT

The present disclosure relates to a method performed by a producer (105) for inputting data items in a ring buffer (100). The producer (105) performs an atomic operation comprising obtaining a sampled value of an input counter and incrementing the input counter. The producer (105) determines an input position to be the sampled value of the input counter modulo a size of the ring buffer (100). The producer (105) determines if a status of an element (103) located at the input position indicates free or occupied. If the status indicates free, the producer (105) inputs a data item at the input position. After the data item has been inputted, the producer (105) sets the status to occupied. If the status indicates occupied, then the producer repeats the determining if status of the element (103) located at the input position is free or occupied until the status indicates free.

19 Claims, 12 Drawing Sheets

(56) References Cited

U.S. PATENT DOCUMENTS

| | | | | |
|---|---|---|---|---|
| 7,239,645 | B2 * | 7/2007 | Suri | H04L 49/90 710/52 |
| 8,234,423 | B2 * | 7/2012 | Liu | G06F 9/526 711/149 |
| 11,886,343 | B2 * | 1/2024 | Jeffery | G06F 9/52 |
| 2005/0204103 | A1 * | 9/2005 | Dennison | G06F 5/10 711/154 |
| 2006/0048162 | A1 | 3/2006 | Boult | |
| 2009/0003204 | A1 | 1/2009 | Okholm et al. | |
| 2009/0204755 | A1 | 8/2009 | Rushworth et al. | |
| 2009/0249356 | A1 * | 10/2009 | He | G06F 9/546 719/314 |
| 2013/0081060 | A1 | 3/2013 | Otenko | |
| 2013/0198419 | A1 | 8/2013 | Jones et al. | |
| 2013/0198479 | A1 | 8/2013 | Jones et al. | |
| 2019/0236749 | A1 | 8/2019 | Gould et al. | |

OTHER PUBLICATIONS

"Built-in Functions for Memory Model Aware Atomic Operations", Chapter 6.55, https://gcc.gnu.org/pipermail/libstdc++/2021-July/052933.html, Jul. 2021, pp. 1-5.

"Circular Buffer", https://en.wikipedia.org/w/index.ph ?title=Circular buffer&oldid=997392916, Dec. 31, 2020, pp. 1-5.

"How to implement a queue using a linked list", AICPA SOC; Educative Inc., License: Creative Commons—Attribution—ShareAlike 4.0 (CC-BY-SA 4.0), https://creativecommons.org/licenses/by-sa/4.0/, 2021, pp. 1-4.

"Lock (computer science)", https://en.wikipedia.org/w/index.ph ?title=Lock computer science &oldid=1020953638, May 2, 2021, pp. 1-8.

"Ring library", Data Plane Developer's Kit, Programmer's Guide, Chapter 7, May 26, 2020, pp. 1-15.

"Spinlock", https://en.wikipedia.org/w/index.php?title=Spinlock &oldid=1017713599, Apr. 14, 2021, pp. 1-4.

"Work Queues", O'Reilly, Understanding the Linux Kernel, 3rd Edition, 2021, pp. 1-9.

Barrington, Andrew, et al., "A Scalable Multi-Producer Multi-Consumer Wait-Free Ring Buffer", SAC'15, Salamanca, Spain, http://dx.doi.org/10.1145/2695664.2695924, Apr. 13-17, 2015, pp. 1321-1328.

Krizhanovsky, Alexander, "Lock-Free Multi-Producer Multi-Consumer Queue on Ring Buffer", Linux Journal, https://www.itpro.tv/linux-training-teams/, Jun. 12, 2013, pp. 1-10.

* cited by examiner

PRODUCER, CONSUMER, SYSTEM AND METHODS FOR INPUTTING AND OUTPUTTING DATA ITEMS INTO AND OUT FROM A RING BUFFER

TECHNICAL FIELD

The present disclosure relates generally to a producer, a method performed by the producer, a consumer and a method performed by the consumer. The present disclosure further relates to a system and a method performed by the system. More particularly, the present disclosure relates to inputting and outputting data items into and out from a ring buffer.

BACKGROUND

Queues are commonly used in operating systems and telecommunication software to handle scheduling of tasks, jobs or items like communication buffers. In systems where jobs or items may originate from more than one source, e.g. a producer, the queue need to handle simultaneous producers inputting items to the queue. Likewise, the queue implementation needs, in the case where there are multiple destinations, e.g. consumers, outputting items from the queue, to ensure that each item is consumed by exactly one consumer.

A queue may be implemented in various ways. The two most common are:

As a linked list of objects where the producers link in data items at the tail of the list and consumers link out data items from the head of the list.

As a ring buffer, sometimes called circular buffer, implemented using an array together with two pointers or indexes which provides the positions in the array to put and get data items.

To handle the situation with multiple concurrently executing producers and/or consumers the implementation needs to secure that the queue remains consistent through simultaneous operation. Existing queue solutions are either based on using locks ref or spin locks ref to avoid simultaneous operation from different producers and consumers; or based on using multiple sets of head-tail pointer pairs for lock-less operation.

The queues described above do not have any filters. In other words, all consumers are equal so that items originating from any producer may be consumed by any consumer. Typical use is a work queue where one or more producers may queue jobs, normally a function pointer and a pointer to some data. These jobs are then pulled by any one from the set of worker threads, e.g. consumers, that service the work queue.

The existing solutions require use of locks to serialize access to the queue or utilizes multiple head/tail pointer pairs and a retry in the case where multiple producers and multiple consumers tried to operate the queue simultaneously.

Modern Central Processing Units (CPU) provide support for a CPU to suspend execution and wait for an update of a certain memory location. Once that memory location is being written to by either some other CPU or by some peripheral device, e.g. a Network Interface Card (NIC), the CPU will resume execution. The main reason to suspend execution during the wait time is to reduce power consumption. On AMD CPU's this is available to user space execution through the instructions MONITORX, to set up the memory position to monitor, and MWAITX to suspend execution.

To make use of the feature to allow a CPU to suspend execution in an efficient way, it is a need for a way to implement a queue where the consumers do not wait for, e.g. monitor, the same memory position to be updated. In the case with the linked list and the ring buffer, as described earlier, the consumer would need to monitor either the head pointer of the linked list or the output pointer or output index of the ring buffer. This way, all the consumers would resume execution when the queue is updated and then they need to arbitrate access to the item to pull from the queue, using locks or some other lockless scheme. This is inefficient both from a power perspective as well as from execution time perspective.

Therefore, there is a need to at least mitigate or solve this issue.

SUMMARY

An object is to obviate at least one of the above disadvantages and to improve inputting and outputting of data items in and from a ring buffer.

According to a first aspect, the object is achieved by a method performed by a producer for inputting data items in a ring buffer. The ring buffer comprises a number of elements. The ring buffer is associated with an input counter. The producer performs an atomic operation comprising obtaining a sampled value of the input counter and incrementing the input counter. The producer determines an input position in the ring buffer to be the sampled value of the input counter modulo a size of the ring buffer. The producer determines if a status of the element located at the input position indicates that the element is free or occupied. If the status indicates free, then the producer inputs the data item in the element located at the input position. After the data item has been inputted, the producer sets the status of the element to occupied. Else, if the status indicates occupied, then the producer repeats the step of determining if status of the element located at the input position is free or occupied until the status indicates free.

According to a second aspect, the object is achieved by method performed by a producer for inputting multiple data items into a ring buffer. The ring buffer comprises a number of elements. The ring buffer is associated with an input counter. The producer performs an atomic operation comprising obtaining a sampled value of the input counter and incrementing the input counter with a number of data items to insert. The producer sets an index to zero prior to inputting a first data item into the ring buffer. The producer determines an input position in the ring buffer to be the sampled value of the input counter plus the index modulo a size of the ring buffer. The producer determines if a status of the element located at the input position indicates that the element is free or occupied. If the status indicates free, the producer inputs a data item in the element located at the input position. After the data item has been inputted, the producer sets the status of the element to occupied. Else, if the status indicates occupied, then the producer repeats the step of determining if status of the element located at the input position is free or occupied is repeated until the status indicates free. After the first data item has been inputted, the producer increments the index with one after each of the data items have been inputted into the ring buffer. After each data item has been inputted into the ring buffer, the producer compares the index with the number of data items to be inputted. If the index is lower than the number of data items to be inputted, the producer handles the next data item. If the index is not lower than the number of data items to be inputted, the producer determines that all data items have been inputted into the ring buffer.

According to a third aspect, the object is achieved by a method performed by a consumer for outputting data items from a ring buffer. The ring buffer comprises a number of elements. The ring buffer is associated with an output counter. The consumer performs an atomic operation comprising to obtain a sampled value of the output counter and to increment the output counter. The consumer determines an output position in the ring buffer to be the sampled value of the output counter modulo a size of the ring buffer. The output position is unique for the consumer. The consumer monitors a status of the element at the output position. The status indicates that the element is free or occupied. If the status indicates free, the consumer continues to monitor the status of the element until the status indicates occupied. If the status indicates occupied, the consumer determines that the element has been validly read at the output position. After it has been determined that the element has been validly read, the consumer sets the status of the element to free. The consumer outputs the data item from the element which has been validly read and located at the output position.

According to a fourth aspect, the object is achieved by a producer for inputting data items in a ring buffer. The ring buffer comprises a number of elements. The ring buffer is associated with an input counter. The producer is adapted to perform an atomic operation comprising to obtain a sampled value of the input counter and to increment the value of the input counter. The producer is adapted to determine an input position in the ring buffer to be the sampled value of the input counter modulo a size of the ring buffer. The producer is adapted to determine if status of the element located at the input position indicates that the element is free or occupied. The producer is adapted to, if the status indicates free, input the data item in the element located at the input position. The producer is adapted to, after the data item has been inputted, set the status of the element to occupied. The producer is adapted to, if the status indicates occupied repeat the determining if status of the element located at the input position is free or occupied until the status indicates free.

According to a fifth aspect, the object is achieved by a producer for inputting multiple data items into a ring buffer. The ring buffer comprises a number of elements. The ring buffer is associated with an input counter. The producer is adapted to perform an atomic operation comprising obtaining a sampled value of the input counter and incrementing the input counter with a number of data items to insert. The producer is adapted to set an index to zero prior to inputting a first data item into the ring buffer. The producer is adapted to determine an input position in the ring buffer to be the sampled value of the input counter plus the index modulo a size of the ring buffer. The producer is adapted to determines if a status of the element located at the input position indicates that the element is free or occupied. The producer is adapted to, if the status indicates free, input a data item in the element located at the input position. The producer is adapted to, after the data item has been inputted, set the status of the element to occupied. The producer is adapted to, else, if the status indicates occupied, repeat the step of determining if status of the element located at the input position is free or occupied is repeated until the status indicates free. The producer is adapted to, after the first data item has been inputted, increment the index with one after each of the data items have been inputted into the ring buffer. The producer is adapted to, after each data item has been inputted into the ring buffer, compare the index with the number of data items to be inputted. The producer is adapted to, if the index is lower than the number of data items to be inputted, handle the next data item. The producer is adapted to, if the index is not lower than the number of data items to be inputted, determine that all data items have been inputted into the ring buffer.

According to a sixth aspect, the object is achieved by a consumer for outputting data items from a ring buffer. The ring buffer comprises a number of elements. The ring buffer is associated with an output counter. The consumer is adapted to perform an atomic operation comprising to obtain a sampled value of the output counter and to increment the output counter. The consumer is adapted to determine an output position in the ring buffer to be the sampled value of the output counter modulo a size of the ring buffer. The output position is unique for the consumer. The consumer is adapted to monitor a status of the element at the output position. The status indicates that the element is free or occupied. The consumer is adapted to, if the status indicates free, continue to monitor the status of the element until the status of indicates occupied. The consumer is adapted to, if the status indicates occupied, determine that the element has been validly read at the output position. The consumer is adapted to, after it has been determined that the element has been validly read, set the status of the element to free. The consumer is adapted to output the data item from the element which has been validly read and located at the output position.

According to a seventh aspect, the object is achieved by a method performed system for inputting and outputting data items into and from a ring buffer. The system comprises at least one producer and at least one consumer. The ring buffer comprises a number of elements and the ring buffer is associated with an input counter and an output counter. The method comprises the steps of the first aspect or the second aspect performed by the at least one producer, and the steps of any the third aspect performed by the at least one consumer.

According to an eight aspect, the object is achieved by a system for inputting and outputting data items into and from a ring buffer. The system comprises at least one producer and at least one consumer. The at least one producer is adapted to carry out the method according to the first aspect or the second aspect. The at least one consumer is adapted to carry out the method according to the third aspect.

Since the consumer has a unique output position in the ring buffer to monitor, no other consumer will monitor and output data items from the same element in the ring buffer. Thus, inputting and outputting of data items in and from a ring buffer is improved.

The present disclosure herein affords many advantages, of which a non-exhaustive list of examples follows:

One advantage is that the consumer determines a position in the ring buffer to output a data item from that is unique, i.e. only one consumer will watch each position in the ring buffer. This way, the need to repeatedly arbitrate access by multiple consumers to the same position in the ring buffer is avoided, since it is handled by a single atomic operation where the consumer determines the position to watch.

Another advantage is that the elements comprised in the ring buffer may be dimensioned such that they do not share cache line, which reduces the need for cache line updates, e.g. snooping. If elements share cache line, an update in one element would cause invalidation of the cache line, and local caches of the CPU cores where the consumer is monitoring elements that are in the cache line would need to have their cache line updated.

A further advantage is that the elements comprised in the ring buffer may be dimensioned such that they fit the size of memory area that supports unique memory monitoring. Such monitoring is used to allow a CPU to go to a power saving state where its clock is gated and the CPU is blocked until a write operation to the monitored memory area occurs, either initiated from another CPU or an I/O device writing to that memory location. By having each consumer monitoring "its own" position, only the consumer that is monitoring this certain ring buffer position resumes execution when the position is updated, avoiding the power consumption caused by more consumers being resumed.

Another advantage of the present disclosure is that it is lockless, and this increases the efficiency both from a power perspective as well as from execution time perspective, as compared to a method which uses locks. The CPU's comprising the consumer only need to wake up to handle items that match the position in the ring buffer they got. If all consumers would monitor the front of the ring buffer, all would wake up from the input instruction just to arbitrate one consumer to pick it. With respect to the execution time, when a data item is inserted into the element at the position monitored by a consumer, that consumer immediately knows that the data item belongs to it and does not need to arbitrate that using locks or other means, so the insertion job can be deployed, consumed and handled with a shorter latency.

A further advantage of the present disclosure is that it enables producers to insert multiple data items into the ring by using only one single atomic operation with some store instructions to store the data.

Another advantage of the present disclosure is that the producers can input data items into multiple data items using only one instruction.

The present disclosure is not limited to the features and advantages mentioned above. A person skilled in the art will recognize additional features and advantages upon reading the following detailed description.

BRIEF DESCRIPTION OF THE DRAWINGS

The present disclosure will now be described in more detail by way of example only in the following detailed description by reference to the appended drawings in which:

FIGS. 10*a* and 9*b* are schematic diagrams illustrating a consumer.

The drawings are not necessarily to scale, and the dimensions of certain features may have been exaggerated for the sake of clarity. Emphasis is instead placed upon illustrating the principle.

DETAILED DESCRIPTION

Figure 1:
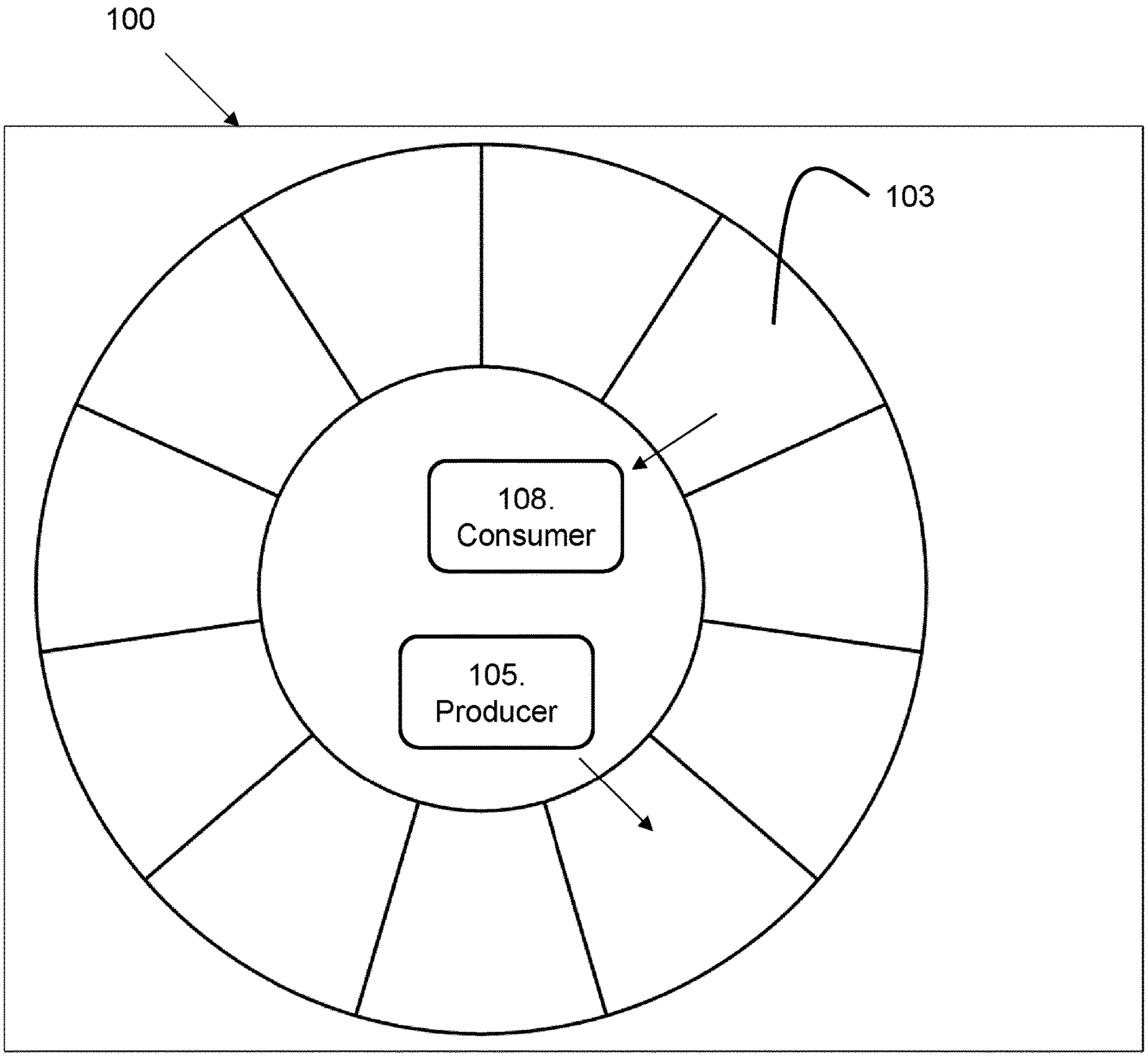
FIG. 1 is a schematic drawing illustrating a ring buffer.

FIG. 1 is a drawing illustrating a ring buffer 100. The ring buffer 100 is for a data processing system. The ring buffer 100 may be referred to as a circular buffer. The ring buffer 100 comprises a vector of elements 103. Using other words, the ring buffer 100 is realized with a vector. The ring buffer 100 comprises n number of elements 103, where n is a positive integer larger than one. The ring buffer 100 may comprise any n number of elements 103, where n is a positive integer. The n number of elements 103 may, for good performance, be adapted to handle the maximum number of jobs that may queue up. In a first network scenario, may be for example 10 000 or more. For an application with a low inflow, n may be for example 10. Each element 103 is located at a certain position in the ring buffer 100. The position of an element 103 in the ring buffer 100 may be described as an location in the vector of elements 103. The element 103 may be referred to as a cell or a memory cell. The ring buffer 100 comprises a start element 103 or first element 103, and the ring buffer 100 comprises an end element 103 or a last element 103. There may be any suitable number of elements 103 located between the first element 103 and the last element 103.

Each element 103 in the ring buffer 100 may be free or not free. In other words, a status of each element 103 may indicate that the element 103 is free or not free.

Free:

- An element 103 which is free is an element 103 that does not have any content, i.e. there is no data item located, present or comprised in the element 103.
- The status of free may be referred to as an empty element, a non-occupied element, an available element, an element that can be written, but not read etc.
- May be written by a producer who got that position, while reading has no valid semantics.

Not Free:

- An element 103 which is not free is an element 103 that has content, i.e. that a data item is located, present or comprised in the element 103.
- The status of not free may be referred to as an occupied element, a valid element, a full element, an element that may be read, but not written etc.
- Reading provides valid data, may not be written to except by the consumer who got that position to consume, i.e. to set the status of that position to free.

Each element 103 in the ring buffer 100 is adapted to store or comprise a data item. The data item comprised in an element 103 may be outputted from the element 103, when the status of the element 103 indicates a not free element. A data item may be inserted into the element 103 when the status of the element 103 indicates a free element. The data item may be referred to as an object, a data object. The data item may comprise data or it may comprise a pointer or reference to data, or it may comprise both data and a pointer to data, i.e. a pointer to other or more data. When the data item comprises a pointer or reference to data, then the pointer or reference is towards a location where the data is stored. The data item may comprise a pointer to a buffer with received network data. The data item may comprise a structure representing a task to perform, i.e. combining a function pointer and a data pointer, for example. The data item may comprise one or more pointers, and the pointers may be a data pointer or a function pointer, or both a data pointer and a function pointer. The data item may comprise a function pointer and a data pointer in a scenario when the ring buffer 100 is used to implement a work queue.

The elements 103 comprised in the ring buffer 100 may be equally sized. The data items that are inputted and outputted from the ring buffer 100 may all be of the same type or they may be of different types, where the type is either data or a pointer or reference to data.

As schematically illustrated in FIG. 1, a producer 105 and a consumer 108 have access to the buffer ring 100. Note that FIG. 1 illustrates one producer 105 and one consumer 108, but there may be any m number of producers 105 and any p number of consumers 108 that have access to the buffer ring 100, where m and p are positive integers. Using other words, there may be one or multiple producers 105 and one or multiple consumers 108 that have access to the buffer ring 100 at the same time. Consequently, the ring buffer 100 may be referred to as a multi-producer, multi-consumer ring buffer. For example, there may be 256 producers 105 and 265 consumers 108 that have access to the buffer ring 100. The term "access" refers to inputting and outputting of data items in the buffer ring 100. The producer 105 may be referred to as a producer thread, a producer unit, a writer, an input unit, a producer computing device etc. The consumer 108 may be referred to as a consumer thread, a consumer unit, a reader, an output unit, a consumer computing device etc.

The producer 105 is adapted to produce data items and to input the produced data items in the ring buffer 100, i.e. in elements 103 comprised in the ring buffer 100. The consumer 108 is adapted to consume data items that it outputs from the ring buffer 100, i.e. from elements 103 comprised in the ring buffer 100. Inputting data items may be referred to as inserting data items, inserting data items, adding data items, writing data items, populating data items, enqueues data items etc. Outputting data items may be referred to as retrieving data items, reading data items, pulling data items, dequeuing data items etc. As mentioned above, the ring buffer 100 comprises a vector of elements 103. On reaching the last element 103 the vector, the producer 105 and the consumer 108 loops back to the beginning and to the first element 103 of the vector. The consumer 108 tracks behind the producer 105 in the ring buffer 100.

The ring buffer 100 comprises a fixed number of equally sized elements 103. The number of elements 103 in the ring buffer 100 may be equal to or greater than the number of consumers 108 that may concurrently request items from the ring buffer 100. Each element 103 may have a status attribute which indicates whether the element 103 is free or not.

An input counter (icnt) is associated with the ring buffer 100. The input counter may be an atomic unsigned integer, only counting upwards and wraps at the arithmetic limit of the integer. The value of the input counter modulo the size, i.e. number of elements 103, of the ring buffer 100 serves as the position at where elements 103 are inputted into the ring buffer 100. The term atomic refers to "atomically operated on", i.e. one can in one operation read, modify and write the counter. I.e. if one consumer 108 or producer 105 performs an atomic fetch and add procedure, only that consumer 108 or producer 105 will retrieve that read value and a competing consumer 108 or producer 105 would read the value after update from the consumer 108 or producer 105.

An output counter (ocnt) is associated with the ring buffer 100. The output counter (ocnt) may be an atomic unsigned integer, only counting upwards and wraps at the arithmetic limit of the integer. The value of the output counter modulo the size, i.e. number of elements 103, of the ring buffer 100 serves as the position or point at where elements 103 are outputted from the ring buffer 100.

The present disclosure makes use of atomic operations, e.g. atomic_fetch_add or fetch_add, to operate the counters, e.g. the input counter and output counter. The counters will be described in more detail below.

The elements 103 in the ring buffer 100 are located at a position. There may be input positions and output positions. The positions may be referred to as atomic pointers to entries in the ring buffer 100. The positions may be used in combination with a scheme where the consumers 108 pre-allocate positions in the ring buffer 100 combined with an indication in the element 103 itself whether it is free or not.

The consumer 108 determines an output position in the ring buffer 100 to output or pull a data item from that is unique. The output position is unique because it is determined using a modulo operation, i.e. the output position nis the sampled value (ocnt_s) of the output counter (ocnt) modulo the size of the ring buffer. The output position is unique in that only one consumer 108 is allowed to monitor and output a data item from an element 103 at this position. This may be described as the consumer 108 has pre-allocated a position in the ring buffer 100 which it would monitor and output data items from. This means that only one consumer 108 will monitor its unique output position in the ring buffer 100. This way, the need to repeatedly arbitrate access by multiple consumers 108 to the same position in the ring buffer 100 is avoided. This is obtained with one single atomic operation where the consumer 108 determines the position in the ring buffer 100 to watch. With this, multiple consumers 108 may output data items from the ring buffer 100 at the same time, but from their respective unique output position.

There are at least two different purposes to avoid having the consumers 108 monitoring the same position. One purpose that the consumer 108 may have a local cache memory and when that memory is being updated, e.g. due to an insertion into the ring buffer 100, the local cache of all the consumers 108 monitoring that position will need to be updated even though only one consumer 108 will output the item being inserted. This is avoided by aligning the element memory position and size of the ring buffer 100 to the size of the cache line of the consumer 108, e.g. the processor of the consumer 108. The other purpose is that if the consumer 108 supports suspending execution await update of a memory location, as described in earlier. Then it is desired that each consumer 108 monitors its own memory position or range which. The present disclosure may benefit from this by aligning the element memory position and size of the ring buffer 100 to the size which the consumer 108 may monitor to resume execution.

Some examples of the inputting and outputting of data items in the ring buffer 100 will now be described.

Figure 2:
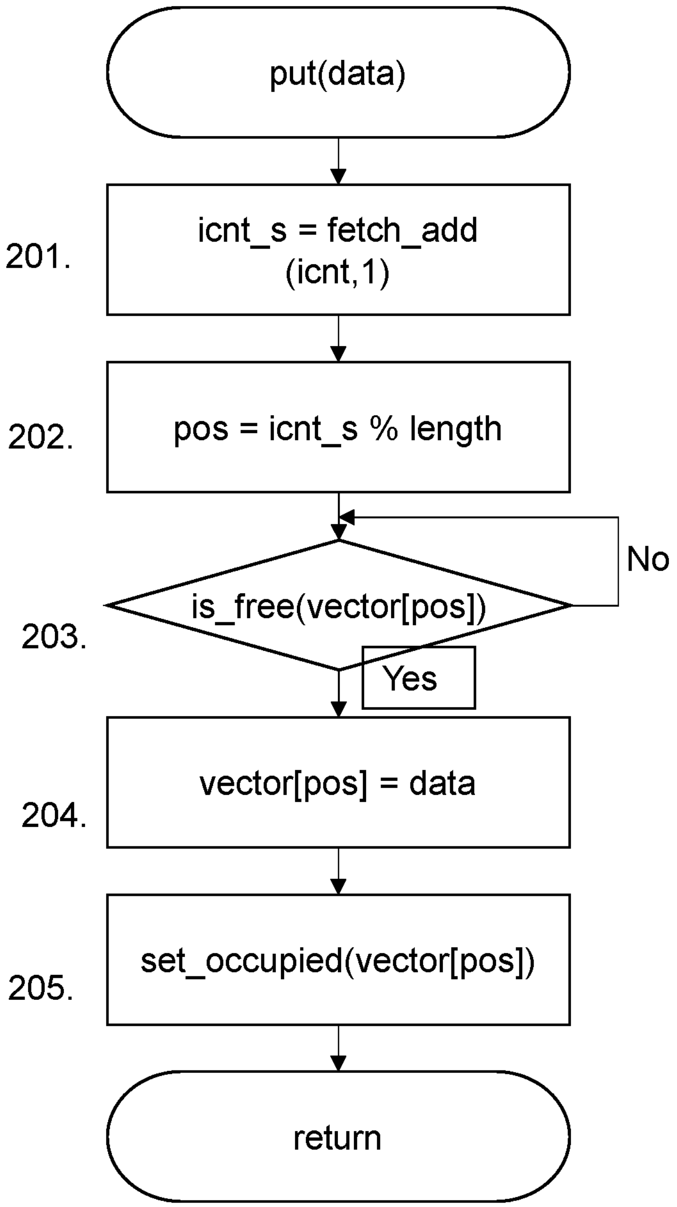
FIG. 2 is a flow chart illustrating inputting of one data item in a ring buffer.

FIG. 2 is a flow chart illustrating a method for inputting one data item in the ring buffer 100. This may be described as to put or enter a data item into the ring buffer 100, that the producer 105 performs a put operation. The producer 105 has produced the data item before step 200 is performed. The method comprises at least the following steps, which steps may be performed in any suitable order than described below:

The producer 105 determines that it has a data item to input into the ring buffer 100, i.e. it initiates a put(data) operation.

Step 201

The producer 105 executes a fetch_add operation, e.g. an atomic fetch_add operation, on an input counter (icnt) to atomically get the sampled input counter (icnt_s) and forwards the input counter (icnt) to its next value, possibly wrapping to zero. The phrase "wrapping to zero" may be described as when the input counter (icnt) has reached its maximum value, then it will get the value 0 at the next incrementation. The sampled input counter (icnt_s) is the sampled value of the input counter (icnt) before it is incremented. The sampled value of the input counter may be described as the current value of the input counter.

Execution of the fetch_add operation may be described as the producer 105 reading the input counter (icnt). Forwarding the input counter (icnt) to its next value may be described as the producer 105 incrementing the input counter (icnt).

The input counter (icnt) may be any suitable counter. The input counter (icnt) may be described as a counter associated with the inputting of the data item and which counts upwards. The input counter may be an unsigned integer.

Step 202

The producer 105 determines the input position (pos) in the ring buffer 100. The input position is determined to be the sampled input counter (icnt_s) modulo (%) the length of the ring buffer 100. The length of the ring buffer 100 may be referred to as the size of the ring buffer 100 and is the same as the number of elements 103 comprised in the ring buffer 100. The input position (pos) may be referred to as an insertion point. The % sign seen in FIG. 2 represents the modulo function. The input position (pos) is a value.

Step 203

The producer 105 checks if the status of the element 103 at the input position (pos) that was determined in step 202 is free or not. If the element 103 located at the position is not free, indicated with "no" in FIG. 2, the producer 105 may be kept looping step 203 until the element 103 becomes free. When the producer 105 is kept looping step 203, it repeatedly reads the status and may be seen as being blocked in the inputting operation. The producer 105 continues to monitor the status of the element 103 until it detects that it is free. If the element 103 is free, indicated with "yes" in FIG. 2, then the method proceeds to step 204.

The input position (pos) may point to an occupied element 103, for example in the case where the buffer ring 100 is full. Then the producer 105 needs to wait for that position to become free and then it can input its data item to that position. For a healthy and non-exhausted system, the ring buffer 100 may be dimensioned so that this never or rarely happens.

Step 204

The producer 105 inputs the data item into the element 103 located at the input position (pos), possibly with the status free. Using other words, the input position (pos) is populated with its data item by the producer 105.

Step 205

The producer 105 sets the status of the element 103 at the input position (pos) to occupied, i.e. valid or not free. In other words, the status is changed from free to not free. After step 205, the inputting method may be considered as being completed.

Figure 3:
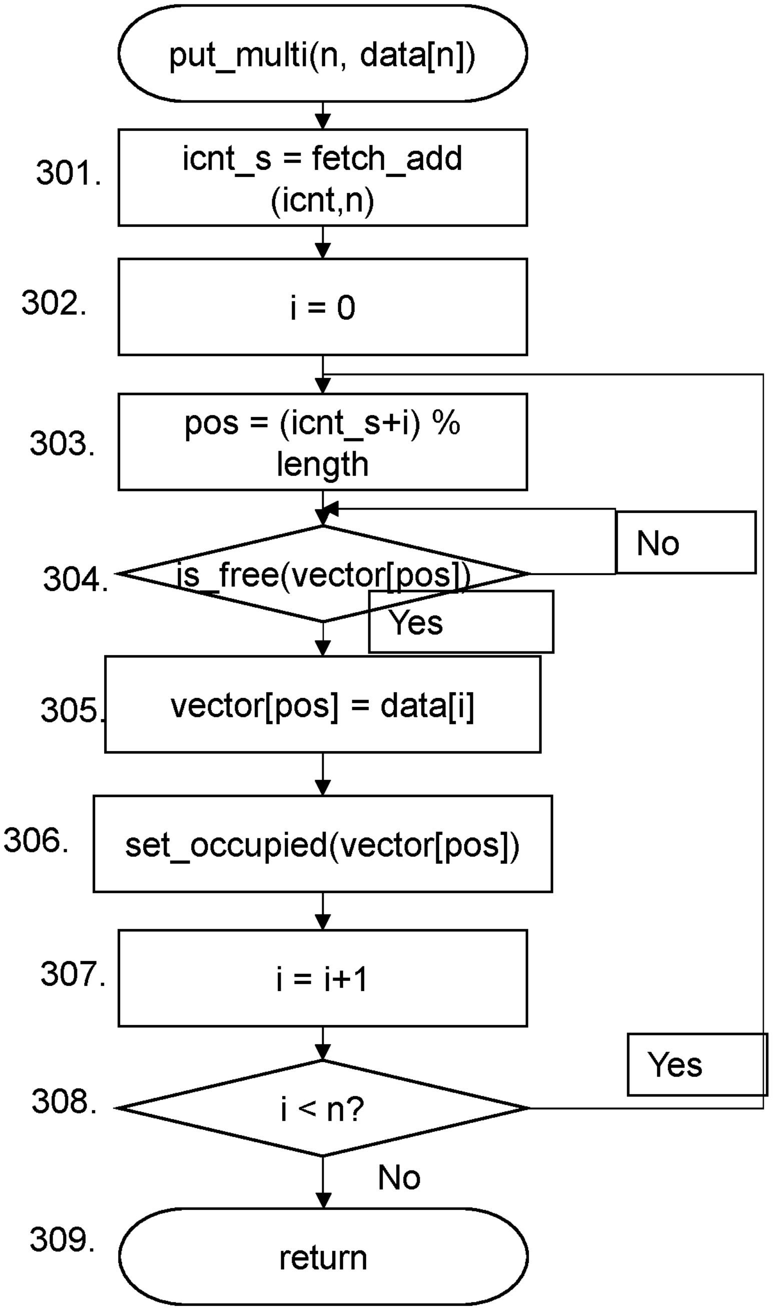
FIG. 3 is a flow chart illustrating inputting of multiple data items in a ring buffer.

FIG. 3 is a flow chart illustrating a method for inputting multiple data items into the ring buffer 100 in sequence. This may be described as to put multiple data items into the ring buffer 100, that the producer 105 performs a put multiple operation or a multi-put operation. The producer 105 has produced the multiple data items before step 300 is performed. Thus, the difference between the methods in FIG. 2 and FIG. 3 is that the FIG. 2 illustrates inputting of one data item and FIG. 3 illustrates inputting of multiple data items. The method comprises at least the following steps, which steps may be performed in any suitable order than described below:

In FIG. 3, the term multiple is indicated with n, and n is a positive integer larger than 1.

Step 301

This step corresponds to step 201 in FIG. 2 with the difference that step 301 involves multiple data items and step 201 involves one data item. The producer 105 executes a fetch_add operation, e.g. an atomic fetch_add operation, on an input counter (icnt) to atomically get the sampled value of the input counter (icnt_s). The producer 105 increments the input counter (icnt) by the n number of data items to be inserted in sequence, possibly wrapping to zero.

Step 301 may be described as the producer 105 reading the input counter (icnt) and increments the input counter (icnt) by the number of elements 103 to insert (n), for example using an atomic operation.

The input counter (icnt) may be any suitable counter. The input counter (icnt) may be described as a counter associated with the inputting of the data item and which counts upwards. The input counter (icnt) may be an unsigned integer.

Step 302

The producer 105 sets an index to zero, i=0. The index is sent to zero prior to inputting the first data item into the ring buffer, i.e. the first data item of the multiple data items to be inputted. In other words, the producer 105 initializes the index (i) for the input data to zero.

Step 303

This step corresponds to step 202 in FIG. 2. The producer 105 determines the input position (pos) in the ring buffer 100. The input position is determined to be the sampled input counter (icnt_s) plus the index (i) modulo (%) the length of the ring buffer 100. The length of the ring buffer 100 may be referred to as the size of the ring buffer 100 and is the same as the number of elements 103 comprised in the ring buffer 100. The % sign seen in FIG. 3 represents the modulo function. The input position (pos) is a value.

The input position in step 303 is determined in a different way than in step 202 in that the index (i) is taken into account in step 303, in addition to the sampled input counter (icnt_s) and the length of the ring buffer 100. In step 202, only the sampled input counter (icnt_s) and the length of the ring buffer 100 are taken into account.

Step 304

This step corresponds to step 203 in FIG. 2. The producer 105 checks if the status of the element 103 at the input position (pos) that was determined in step 303 is free or not. If the element 103 located at the input position (pos) is not free, indicated with "no" in FIG. 3, the producer 105 may be kept looping step 304 until the element 103 at the input position (pos) becomes free. When the producer 105 is kept looping step 304, it repeatedly reads the status and may be seen as being blocked in the inputting operation. The producer 105 continues to monitor the status of the element 103 at the input position (pos) until it detects that it is free. If the element 103 is free, indicated with "yes" in FIG. 3, then the method proceeds to step 305.

The input position (pos) may point to an occupied element 103, for example in the case where the buffer ring 100 is full. Then the producer 105 needs to wait for that input position (pos) to become free and then it can input its data item to that input position (pos). For a healthy and non-exhausted system, the ring buffer 100 may be dimensioned so that this never or rarely happens.

Step 305

This step corresponds to step 204 in FIG. 2. The producer 105 inputs, for the index i, the data item into the element 103 located at the input position (pos) and when the status has been determined to be free. Using other words, the input position (pos) is populated with its data item by the producer 105

Step 306

This step corresponds to step 205 in FIG. 2. The producer 105 sets the status of the element 103 at the index position (pos) to occupied, i.e. valid or not free. In other words, the status is changed from free to not free.

Step 307

After the first data item has been inputted, the producer 105 increments the index i by one, i=i+1, after each of the data items have been inputted into the ring buffer 100.

Step 308

The producer 105 checks if there are remaining data items to be put into the ring buffer 100, i.e. the producer 105 compares the index i with the number of data items to be inputted. In the comparison, the producer 105 checks if $i<n$, where n is the total number of data items that the producer 105 will input into the ring buffer 100. If there are remaining data items to be put into the ring buffer 100, i.e. if the index is lower than the number of data items, then the producer 105 loops back and performs step 303 again. If there are no remaining data items, i.e. all data items have been inputted into the ring buffer 100, then the method proceeds to step 309.

Step 309

If the index i is not lower than the number of data items to be inputted, then the producer 105 determines that all data items have been inputted into the ring buffer 100 and the method is completed.

Steps 303-308 may be performed for one or multiple data items at a time. If the producer 105 determines that consecutive elements 103 are free in parallel, then the producer 105 may update them using one operation. The loop of steps 303-308 may handle multiple data items per lap.

Figure 4:
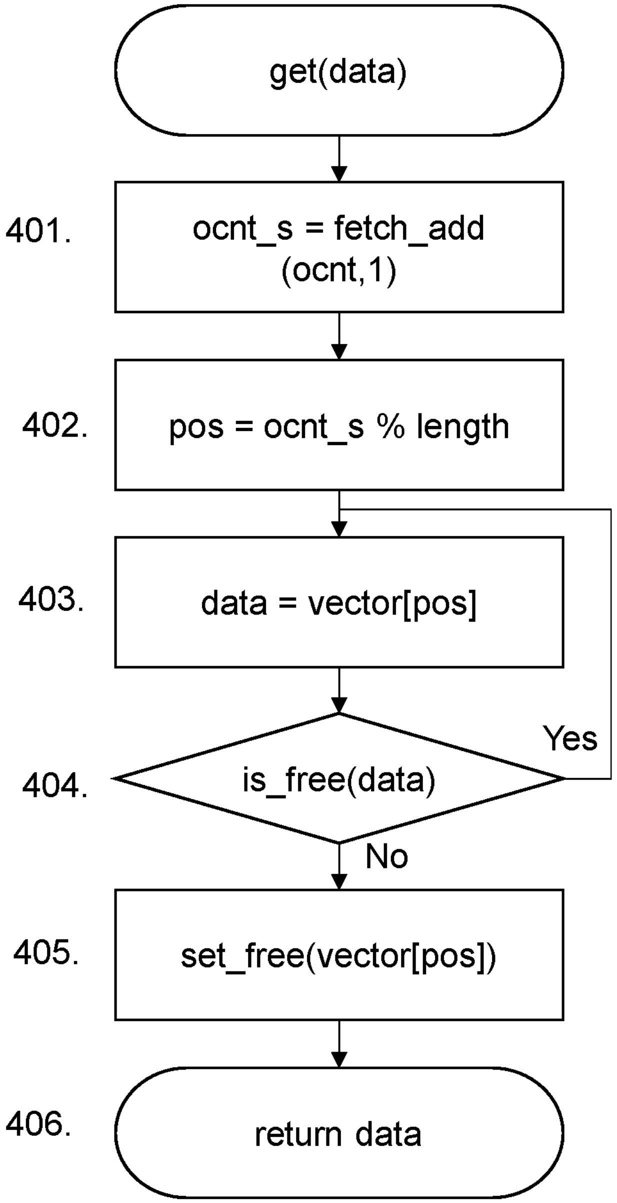
FIG. 4 is a flow chart illustrating outputting of a data items from a ring buffer.

FIG. 4 is a flow chart illustrating a method for outputting data items from the ring buffer 100. This may be described as to get a data item from the ring buffer 100, that the consumer 108 performs a get operation, or that the consumer 108 waits, e.g. polls, for a data item from the ring buffer 100. The producer 105 has inputted the data item before step 300 is performed, and the consumer 108 wants to consume the data item. The method comprises at least the following steps, which steps may be performed in any suitable order than described below:

Step 401

The consumer 108 uses a fetch_add operation, e.g. an atomic_fetch_add operation, on the output counter to atomically get the sampled output counter (ocnt_s) and increment the output counter (oct) to reflect the next position, possibly wrapping to zero. The sampled output counter (ocnt_s) is the sampled value of the output counter (ocnt) before it is incremented. The sampled value of the output counter may be described as the current value of the output counter (ocnt).

Step 401 may be described as the consumer 108 reads the output counter (oct) and increments it, for example using an atomic operation.

The output counter (oct) may be any suitable counter. The output counter (oct) may be described as a counter associated with the outputting of the data item and which counts upwards. The output counter (oct) may be an unsigned integer.

Step 402

The consumer 108 determines the output position (pos) in the ring buffer 100 as the sampled output counter (ocnt_s) modulo (%) the length of the ring buffer 100. Thus, the consumer 108 calculates the point in the ring buffer 100 where to retrieve the data item. The length of the ring buffer 100 may be referred to as the size of the ring buffer 100 and is the same as the number of elements 103 comprised in the ring buffer 100. The % sign seen in FIG. 4 represents the modulo function. The output position (pos) is a value.

This step may be described as the consumer 108 pre-allocates the output position (pos) in the ring buffer 100 where it shall output a data item from. The output position (pos) may be used in combination with a status of the element 103, and this will be described later in more detail.

Step 403

The consumer 108 starts to read or watch, i.e. monitor, the determined output position (pos) for a data item. Watching the determined output position (pos) may be referred to as to poll. The determined output position (pos) is unique for the consumer 108, i.e. no other consumers 108 monitors or outputs data items from the same output position (pos).

Step 404

The consumer 108 checks if the status of the element 103 at the output position (pos) that was determined in step 402 is free or not. If the element 103 is free, indicated with "yes" in FIG. 4, then the method goes back to performing step 403 again. If the element 103 located at the output position (pos) is not free, indicated with "no" in FIG. 4, the method proceeds to step 405.

Step 404 may be described as if the status of the output position (pos) in the ring buffer 100 indicates a free position in the ring buffer 100, the consumer 108 repeats the read and continues to check the status of the output position (pos).

Step 405

This step is performed if the consumer 108 determined in step 404 that the element 103 at the output position (pos) is not free, i.e. that a data item is comprised in the element 103 at the output position (pos). When the data item has been read from the output position (pos) in the ring buffer 100, the consumer 108 may mark the position in the ring buffer 100 as free. In other words, the status of the output position (pos) is changed from not free to free.

Step 406

This step is performed if the consumer 108 determined in step 404 that the element 103 at the output position (pos) is not free, i.e. that a data item is comprised in the element 103 at the output position (pos). The consumer 108 outputs the data item at the output position (pos). The step may also be described as returning the data item to the consumer 108.

Table 1 below provides an overview of some terms used herein:

TABLE 1

| Term | Description | Abbreviation used in figs. |
|---|---|---|
| Ring buffer | Comprises n number of equally sized elements<br>Is realized with a vector of elements | |
| Element | Is comprised in the ring buffer<br>Is adapted to | |

TABLE 1-continued

| Term | Description | Abbreviation used in figs. |
|---|---|---|
| | store a data item Status: Empty or not empty (free or occupied) | |
| Producer | Inputs data in the ring buffer | Prod |
| Consumer | Outputs data from the ring buffer | Cons |
| Input position | Position of or pointer to an element in the ring buffer where a data item is inputted by a producer Sampled value of input counter modulo size of the ring buffer. | pos |
| Output position | Position of or pointer to an element in the ring buffer where a data item is outputted by a consumer. sampled value of output counter modulo size of the ring buffer | pos |
| Index | Used in the method for inputting multiple data items in the ring buffer | i |
| Input counter | A counter in the ring buffer Counter that counts upwards. Input sequence counter. Atomic unsigned integer. | icnt |
| Output counter | A counter in the ring buffer Counter that counts upwards. Output sequence counter. Atomic unsigned integer. | ocnt |
| Sampled input counter | Sampled value of input counter | icnt_s |
| Sampled output counter | Sampled value of output counter | ocnt_s |

Figure 5A:
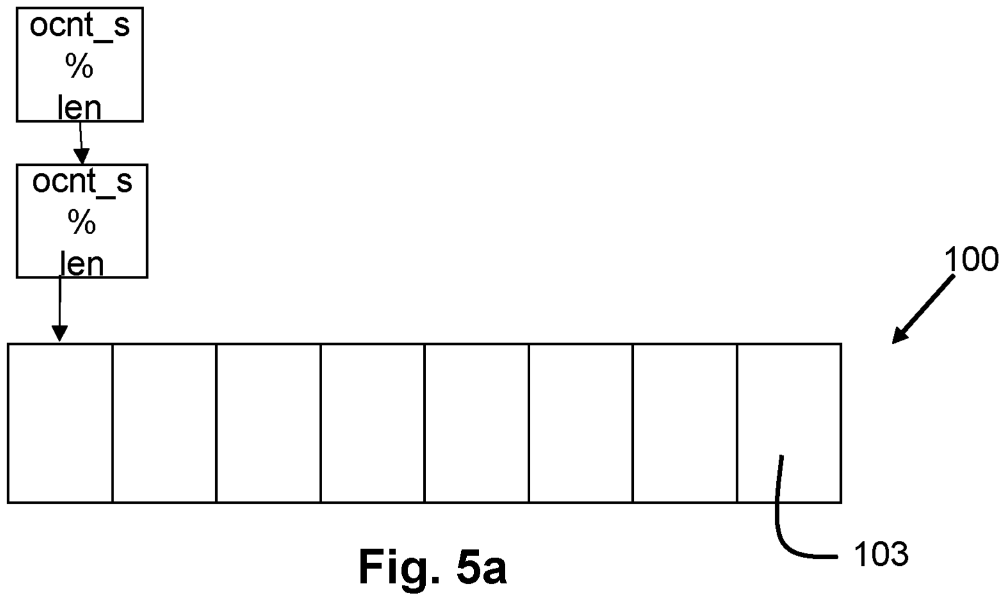
FIGS. 5*a-d* are schematic block diagrams illustrating inputting and outputting of data items.
Figure 5B:
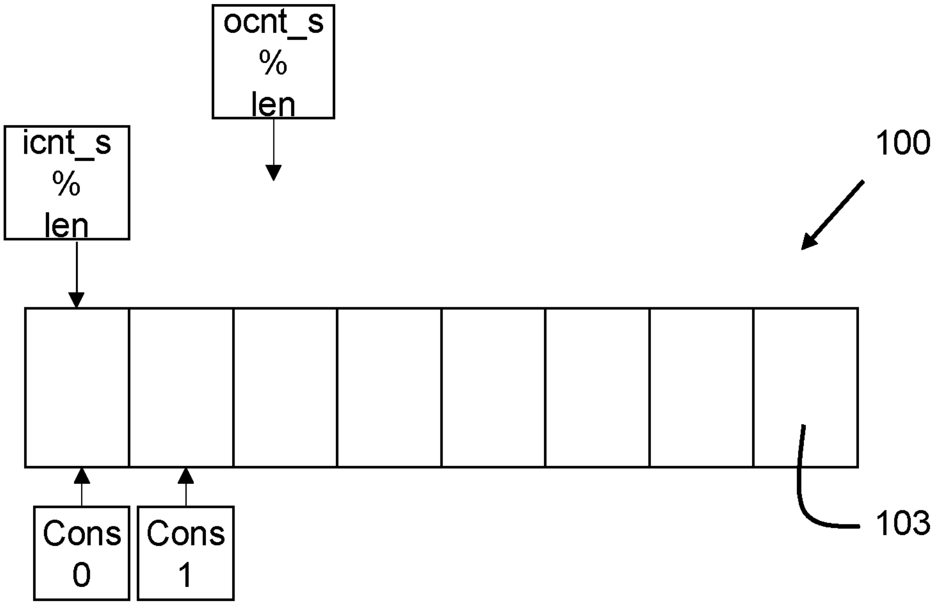
Figure 5C:
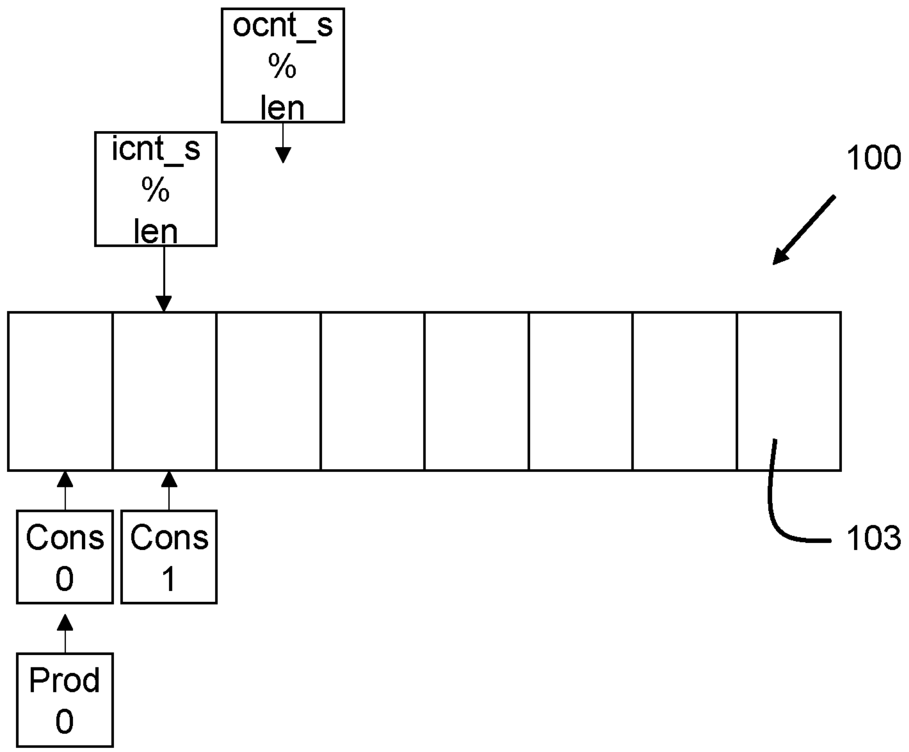
Figure 5D:
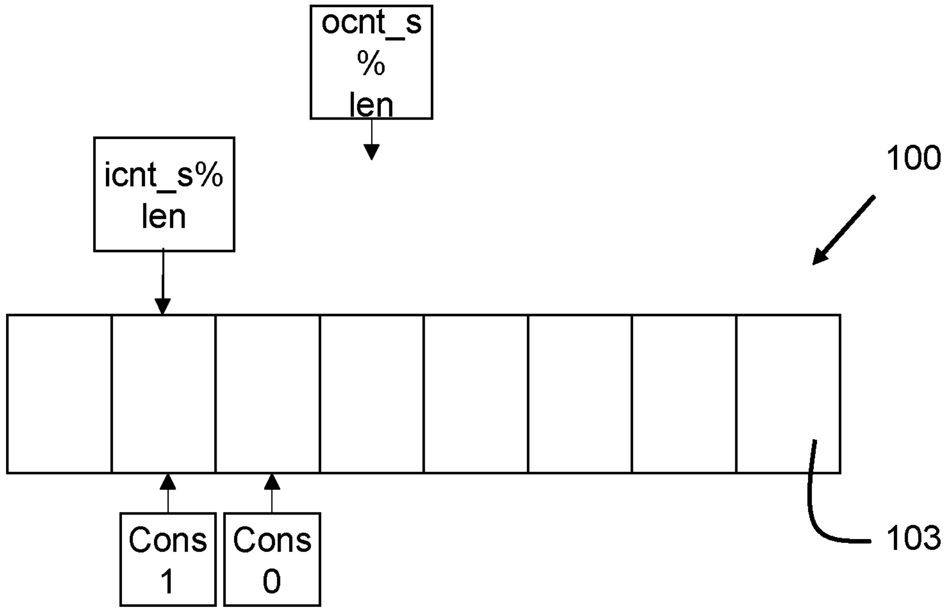

Inputting and outputting of data items into and from the buffer ring 100 will now be described using an example illustrated in FIGS. 5*a*, 5*b*, 5*c* and 5*d*. FIG. 5*a* illustrates an initial state, FIG. 5*b* illustrates a first state, FIG. 5*c* illustrates a second state and FIG. 5*d* illustrates a third state. The states illustrated in FIGS. 5*a*-5*d* take place in consecutive order and starting with the initial state in FIG. 5*a* and ending with the third state in FIG. 5*d*.

The ring buffer 100 in these FIGS. 5*a*-5*d* is illustrated in as a straight vector for the sake of simplicity, but it is to be considered to have a ring shape. The number of elements 103 illustrated in FIGS. 5*a*-5*d* is only an example, and the ring buffer 100 may have any n number of elements 103, where n is a positive integer larger than 1.

FIG. 5*a* illustrates an initial state. In the initial state, the input position (icnt % len) and the output position (ocnt % len) are both zero, i.e. they point to the first element 103 in the ring buffer 100. There are no consumers 108 waiting to output a data item.

FIG. 5*b* illustrates a first state that takes place after the initial state. The output position (ocnt % len) in FIG. 5*b* has advanced two positions, as compared to FIG. 5*a*. The input position (icnt % len) is the same as in FIG. 5*a*, i.e. at the first element 103 in the ring buffer 100. There are two consumers 108 waiting to output a data item from the ring buffer 100. These two consumers 108 are exemplified by Cons 0 and Cons 1 in FIG. 5*b*.

FIG. 5*c* illustrates a second state that takes place after the first state. FIG. 5*c* illustrates the same two consumers 108 Cons 0 and Cons 1 as in FIG. 5*b*. In addition, FIG. 5*c* illustrates a producer 105, i.e. Prod 0. The producer 105 advances the input position (icnt % len) with one position and inputs a data item into the first position. The output position (ocnt % len) remains the same as in FIG. 5*b*.

FIG. 5*d* illustrates a third state that takes place after the second state. One consumer 108, i.e. Cons 0, outputs data from the first position and advances the output position (ocnt % len) with one position. The consumer 108 illustrated as Cons 0 now starts to monitor the third position in the ring buffer 100.

Figure 6:
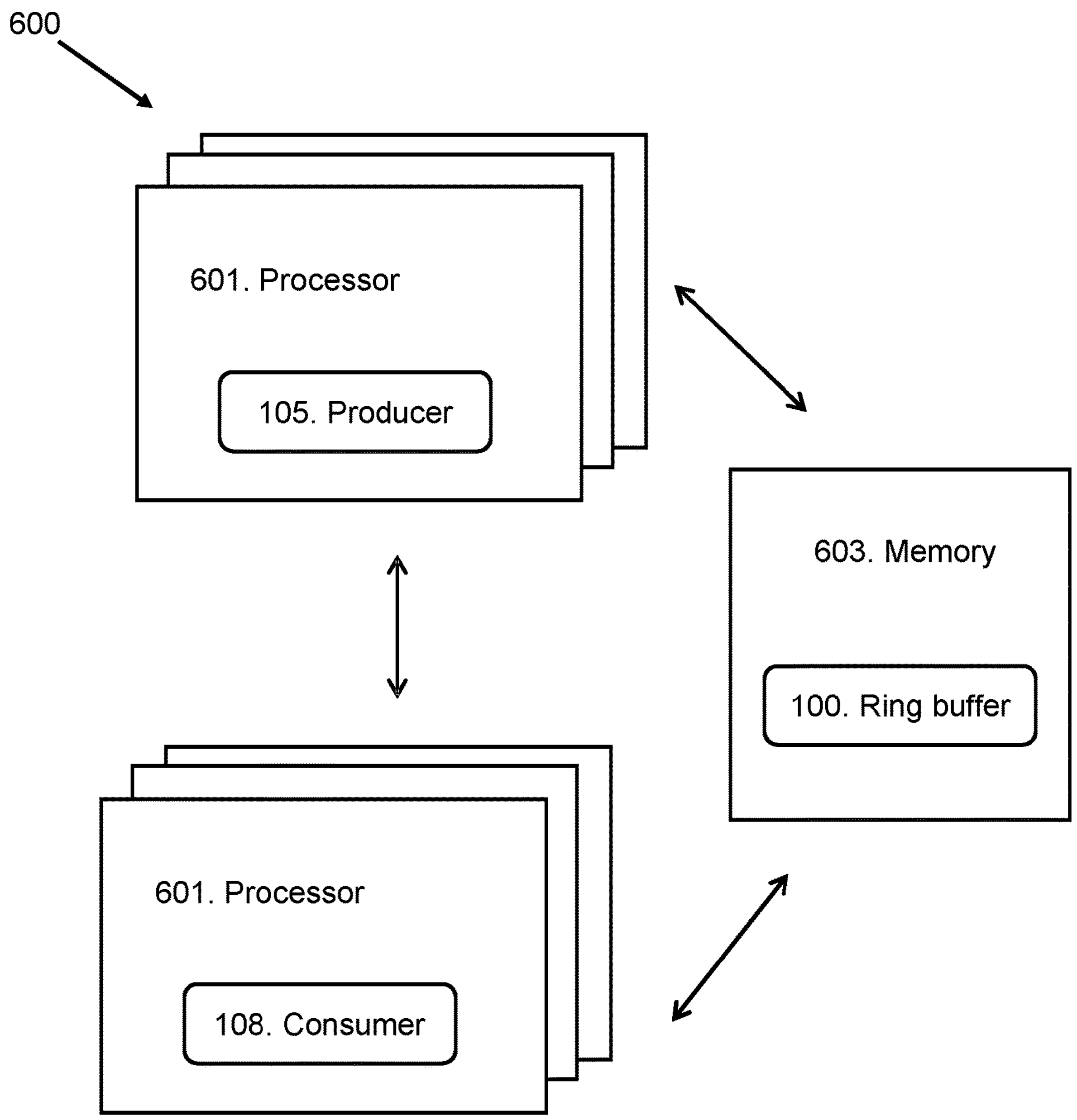
FIG. 6 is a schematic drawing illustrating a data processing system.

FIG. 6 is a schematic drawing of a data processing system 600, also referred to as a system for the sake of simplicity. The system 600 is adapted to implement the present disclosure. The data processing system 600 may be used in any suitable application. A suitable application may be any real time system, it may be related to packet switching, real time control, telecommunications etc. The system 600 comprises one or multiple processors 601, and each processor 601 comprises one or multiple producers 105 or one or multiple consumers 108. There may be multiple processors 601 that each comprises one producer 105 and there may be multiple processors 601 that each comprises one consumer 108. There may be one processor 601 that comprises multiple producers 105 and one other processor 601 that comprises multiple consumers 108. There may be one processor 601 that comprises both one or multiple producers 105 and one or multiple consumers 108. There may be one or multiple producers 105 per processor 601 and one or multiple consumers 108 per processor 601. The "multiple" is illustrated with the multiple boxes behind the processor in FIG. 6. Thus, the system 600 comprises multiple producers 105 and multiple consumers 108. The one or multiple processors 601 may be a hardware processor, or it may be a non-processor hardware block that is adapted to perform the methods described herein.

The consumer 108 may be adapted to act as a consumer 108 only, or it may be adapted to act as both a consumer 108 and a producer 105. For example, during handling of a data item, it may result in one or more data items being inputted into the ring buffer 100, making the consumer 108 also act as a producer.

The processors 601 are adapted to communicate with each other using any suitable communication link, e.g. wired or wireless communication link. The processor 601 may be referred to as a CPU. The processor 601 may comprise internal memory units. The term processor 601 comprises any circuit and/or device suitably adapted to perform the functions described herein. The above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The system 600 comprises a memory 603. The memory 603 comprises the ring buffer 100. The processors 601 are adapted to communicate with a memory 603, i.e. the memory 603 is shared amongst the processors 601 and consequently amounts the producers 105 and consumers 108. The communication may be to input a data item, to output a data item etc. The memory 603 may be for example a Random Access Memory (RAM), a storage medium, such as a Read-Only Memory (ROM) or other non-volatile memory, such as flash memory, or another device accessible via a suitable data interface. The memory 603 may be a stationary memory or a cloud memory. The memory 603 is a read and write memory, and it is accessible by the processor 601. The processor 601 performs coherent random access supporting atomic operations on the memory 603.

The system 600 comprises a computer program or computer program product which carries out the methods described herein. The computer program or computer program product may be stored in the memory 603.

The data processing system 600 exemplified in FIG. 6 may comprise additional units that are not shown in FIG. 6 such as for example communication interface, display unit, other memory units, etc.

Figure 7:
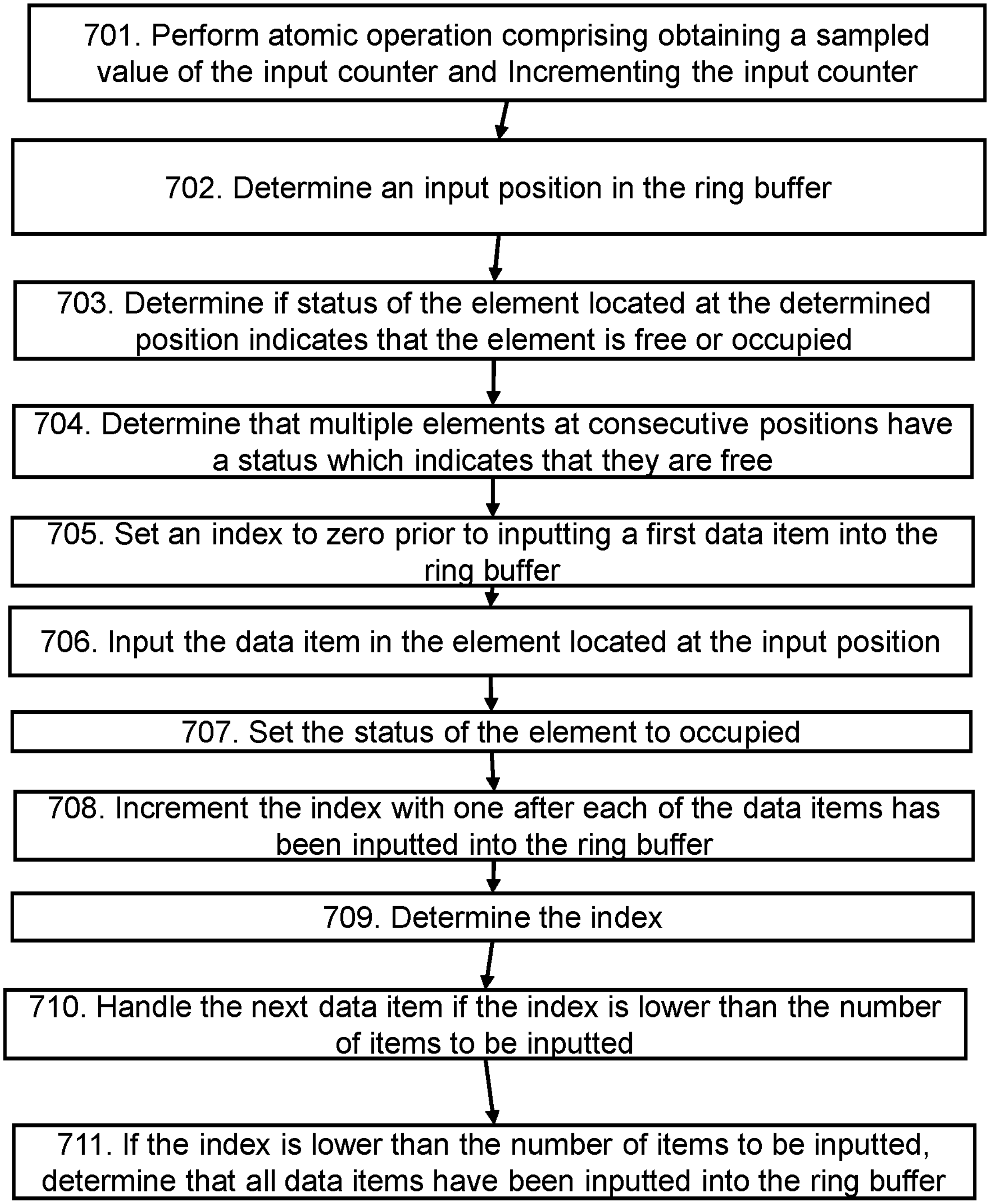
FIG. 7 is a flow chart illustrating a method performed by a producer.

The method for for inputting data items in a ring buffer 100 will now be described with reference to the flowchart depicted in FIG. 7 illustrating the method performed by the producer 105. The ring buffer 100 comprises a number of elements 103, and the ring buffer 100 is associated with an input counter (icnt). The input counter (icnt) may be an atomic unsigned integer and counting upwards. There may be one or multiple data items to be inputted into the ring buffer 100. The number of elements 103 comprised in the ring buffer 100 may be fixed and larger than one, and the elements 103 comprised in the ring buffer 100 may be equally sized. Steps 701-703, 706 and 707 are performed when the producer 105 inputs one data item into the ring buffer 100. Steps 701-703, 705-711 are performed when the producer 105 inputs multiple data items into the ring buffer 100. The method comprises at least one of the following steps, which steps may as well be carried out in another suitable order than described below.

Step 701

This step corresponds to step 201 in FIG. 2 and step 301 in FIG. 3. The producer 105 performs an atomic operation. The atomic operation comprises to obtain a sampled value (icnt_s) of the input counter (icnt). The sampled value of the input counter may be referred to as a sampled input counter, for the sake of simplicity.

The atomic operation may be fetch_add.

The atomic operation further comprises to increments the input counter (icnt).

The input counter may be incremented by a number which corresponds to a number of elements 103 in which a data item is to be inputted.

Using other words, using an atomic operation, the producer 105 obtains a sampled value (icnt_s) of the input counter (icnt) and increments the input counter (icnt).

Step 702

This step corresponds to step 202 in FIG. 2 when one data item is to be inputted into the ring buffer 100 and step 303 in FIG. 3 when multiple data items are to be inputted into the ring buffer 100. The producer 105 determines an input position in the ring buffer 100. The input position may be determined in different ways depending on the number of data items to be inputted into the ring buffer 100.

If the producer 105 should input one data item into the ring buffer 100, then the input position is determined to be the sampled value (icnt_s) of the input counter (icnt_s) modulo a size of the ring buffer 100.

If the producer 105 should input multiple data items into the ring buffer 100, then the input position is determined to be the sampled value (icnt_s) of the input counter (icnt) plus an index (i) modulo the size of the ring buffer 100.

Step 703

This step corresponds to step 203 in FIG. 2 and step 304 in FIG. 3. The producer 105 determines if status of the element 103 located at the input position indicates that the element 103 is free or occupied.

If the status indicates occupied, then the determining of the status is repeated until the status indicates free.

If the status indicates free, then the method proceeds to step 706 to input the data item.

Step 704

This step corresponds to step 304 in FIG. 3. The step may be performed when multiple data items is to be inputted into the ring buffer 100 by the producer 105. The producer 105 may determine that multiple elements 103 at consecutive positions have a status which indicates that they are free.

Step 705

This step corresponds to step 302 in FIG. 3. The step may be performed when multiple data items is to be inputted into the ring buffer 100 by the producer 105. The producer 105 sets an index (i) to zero prior to inputting the first data item into the ring buffer 100.

Step 706

This step corresponds to step 204 in FIG. 2 and step 305 in FIG. 3. The producer 105 inputs the data item in the element 103 located at the determined input position.

The data item may be inputted in the element 103 at step 706 if the status was determined to indicate free in step 703.

When multiple data items are to be inputted into the ring buffer 100 by the producer 105 and if the producer 105 determined in step 704 that multiple elements 103 at consecutive positions have a status which indicates that they are free, then the multiple data items may be inputted into the multiple elements 103 in parallel. Furthermore, the index (i) may be incremented in accordance with the multiple data items.

Step 707

This step corresponds to step 205 in FIG. 2 and step 306 in FIG. 3. After the data item has been inputted, the producer 105 sets the status of the element 103 to occupied.

Step 708

This step corresponds to step 307 in FIG. 3. The step is performed when multiple data items are to be inputted into the ring buffer 100 by the producer 105. After the first data item has been inputted, the producer 105 increments the index (i) with one after each of the data items has been inputted into the ring buffer 100.

Step 709

This step corresponds to step 308 in FIG. 3. The step is performed when multiple data items are to be inputted into the ring buffer 100 by the producer 105. After each data item has been inputted into the ring buffer 100, the producer 105 compares the index (i) with the number of data items to be inputted (n). The comparing may be to check if the index (i) is lower than the number of data items to be inputted or not, i.e. the remaining number of data items to be inputted.

Step 710

The step is performed when multiple data items are to be inputted into the ring buffer 100 by the producer 105. If the index is lower than the number of data items to be inputted the producer 105 handles the next data item.

Step 711

This step corresponds to step 309 in FIG. 3. The step is performed when multiple data items are to be inputted into the ring buffer 100 by the producer 105. If the index is not lower than the number of data items to be inputted, then the producer 105 determine that all data items have been inputted into the ring buffer 100. In other words, there are no more data items waiting to be inputted into the ring buffer 100.

Figure 8:
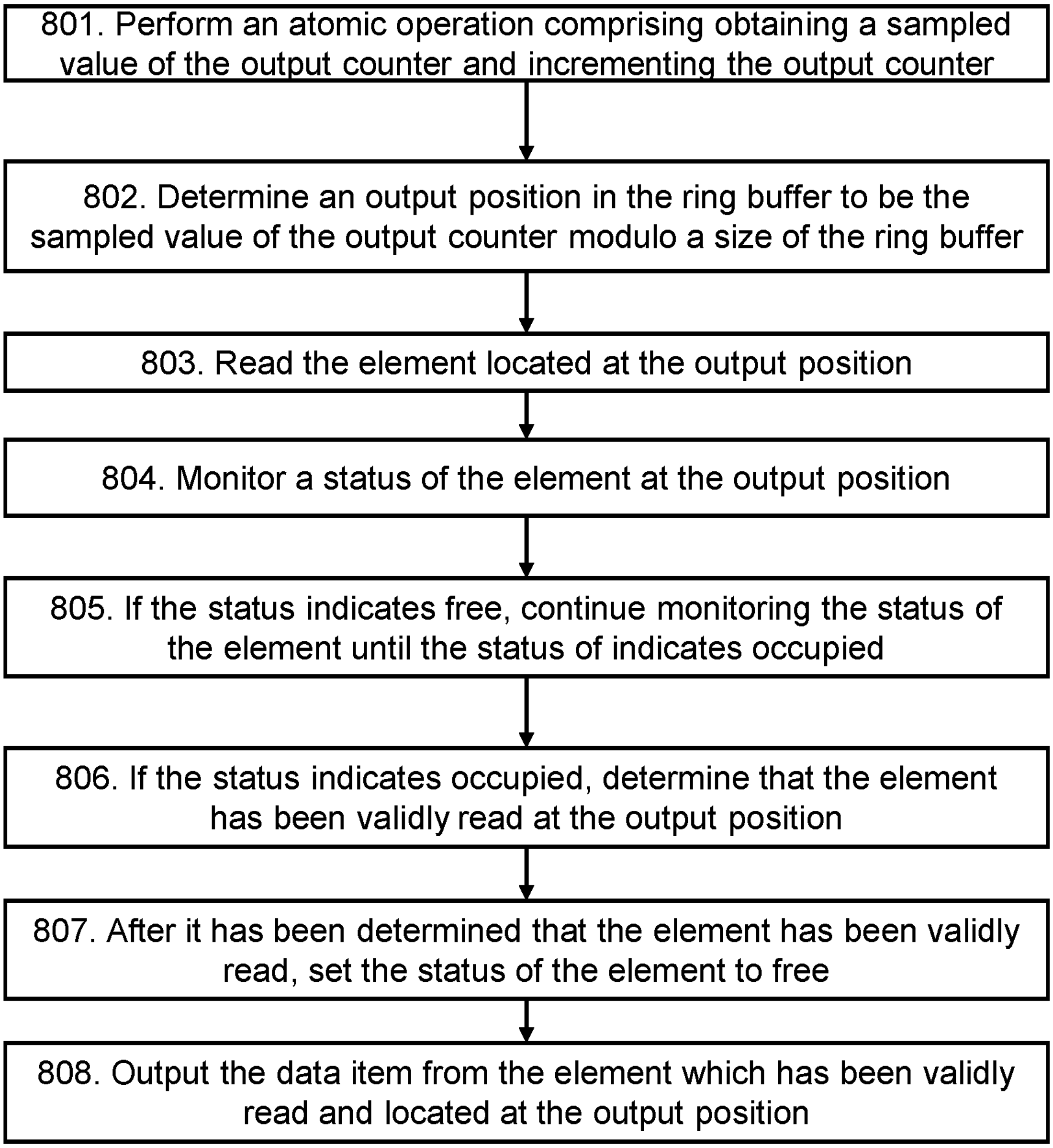
FIG. 8 is a flow chart illustrating a method performed by a consumer.

The method described above will now be described seen from the perspective of the consumer 108. FIG. 8 is a flowchart describing the present method in the consumer 108 for outputting data items from the ring buffer 100. The ring buffer 100 comprises a number of elements 103. The number of elements 103 comprised in the ring buffer 100 may be equal to or greater than a number of consumers 108 that concurrently may output data items from elements 103 in the ring buffer 100. The number of elements 103 comprised in the ring buffer 100 may be fixed and larger than one. The elements 103 comprised in the ring buffer 100 may be equally sized. The ring buffer 100 is associated with an output counter (ocnt). The output counter (ocnt) may be an atomic unsigned integer and counting upwards. The method comprises at least one of the following steps to be performed by the consumer 108, which steps may be performed in any suitable order than described below:

Step 801

This step corresponds to step 401 in FIG. 4. The consumer 108 performs an atomic operation. The atomic operation comprises to obtain a sampled value (ocnt s) of the output counter (ocnt). The sampled value of the output counter may be referred to as a sampled output counter, for the sake of simplicity.

The atomic operation may be a fetch_add operation.

The atomic operation further comprises to increment the output counter (ocnt).

In other words, the consumer 108 obtains a sampled value (ocnt_s) of the output counter (ocnt) and increments the output counter (ocnt), using an atomic operation.

Step 802

This step corresponds to step 402 in FIG. 4. The consumer 108 determines an output position (pos) in the ring buffer 100 to be the sampled value (ocnt_s) of the output counter (ocnt) modulo a size of the ring buffer 100. The output position (pos) is unique for the consumer 108.

Step 803

This step corresponds to step 403 in FIG. 4. The consumer 108 may read the element 103 located at the output position. The status of the element 103 is comprised in the element 103, i.e. information indicating the status of free or occupied is comprised in the element 103.

Step 804

This step corresponds to steps 403 and 404 in FIG. 4. The consumer 108 monitors a status of the element 103 at the output position. The status indicates that the element 103 is free or occupied.

Step 805

If the status indicates free, i.e. the status that was monitored in step 804, the consumer 108 continues monitoring the status of the element 103 until the status of indicates occupied.

Step 806

If the status indicates occupied, i.e. the status that was monitored in step 804, the consumer 108 determines that the element 103 has been validly read at the output position.

Step 807

This step corresponds to step 405 in FIG. 4. After it has been determined that the element 103 has been validly read, i.e. after step 806 has been performed, the consumer 108 sets the status of the element 103 to free.

Step 808

This step corresponds to step 406 in FIG. 4. The consumer 108 outputs the data item from the element 103 which has been validly read and located at the output position.

The method described above will now be described seen from the perspective of the system 600. Below will a method performed by a system 600 for inputting and outputting data items into and from a ring buffer 100 be described. The system 600 comprises at least one producer 105 and at least one consumer 108. The ring buffer 100 comprises a number of elements 103. The ring buffer 100 is associated with an input counter (icnt) and an output counter (ocnt). The method comprises at least one of the following steps to be performed, which steps may be performed in any suitable order than described below:

Step a)

This step corresponds to step 201 in FIG. 2, step 301 in FIG. 3 and step 701 in FIG. 7. The producer 105 performs an atomic operation comprising obtaining a sampled value (icnt_s) of the input counter (icnt) and incrementing the input counter (icnt).

Step b)

This step corresponds to step 202 in FIG. 2, step 303 in FIG. 3 and step 702 in FIG. 7. The producer 105 determines, an input position (pos) in the ring buffer 100 to be the sampled value (icnt s) of the input counter (icnt_s) modulo a size of the ring buffer 100.

Step c)

This step corresponds to step 203 in FIG. 2, step 304 in FIG. 3 and step 703 in FIG. 7. The producer 105 determines if status of the element 103 located at the input position indicates that the element is free or occupied; If the status indicates occupied, then step c) of determining if status of the element 103 located at the input position (pos) is free or occupied is repeated until the status indicates free.

Step d)

This step corresponds to step 204 in FIG. 2, step 305 in FIG. 3 and step 706 in FIG. 7. The producer 105 inputs, if the status indicates free, the data item in the element 103 located at the determined input position (pos).

Step e)

This step corresponds to step 205 in FIG. 2, step 306 in FIG. 3 and step 707 in FIG. 7. After the data item has been inputted, the producer 105 sets the status of the element to occupied.

Step f)

This step corresponds to step 401 in FIG. 4 and step 801 in FIG. 8. The consumer 108 performs an atomic operation comprising to obtain a sampled value (ocnt_s) of the output counter (ocnt) and to increment the output counter (ocnt).

Step q)

This step corresponds to step 402 in FIG. 4 and step 802 in FIG. 8. The consumer 108 determines an output position in the ring buffer 100 to be the sampled value (ocnt_s) of the output counter (ocnt) modulo a size of the ring buffer 100. The output position is unique for the consumer 108.

Step h)

This step corresponds to steps 403 and 404 in FIGS. 4 and 803, 804,805 in FIG. 8. The consumer 108 monitors a status of the element 103 at the output position. The status indicates that the element 103 is free or occupied.

Step i)

The consumer 108 continues, if the status indicates free, to monitor the status of the element 103 until the status of indicates occupied.

Step i)

This step corresponds to step 806 in FIG. 8. The consumer 108 determines, if the status indicates occupied, that the element 103 has been validly read at the output position.

Step k)

This step corresponds to step 405 in FIG. 4 and step 807 in FIG. 8. The consumer 108 sets, after it has been determined that the element 103 has been validly read, the status of the element 103 to free.

Step l)

This step corresponds to step 406 in FIG. 4 and step 808 in FIG. 8. The consumer 108 outputs the data item from the element 103 which has been validly read and located at the output position.

The consumer 108 and producer 105 comprised in the system 600 may perform any of the steps as described above with reference to FIGS. 2-5, 7 and 8.

Figure 9A:
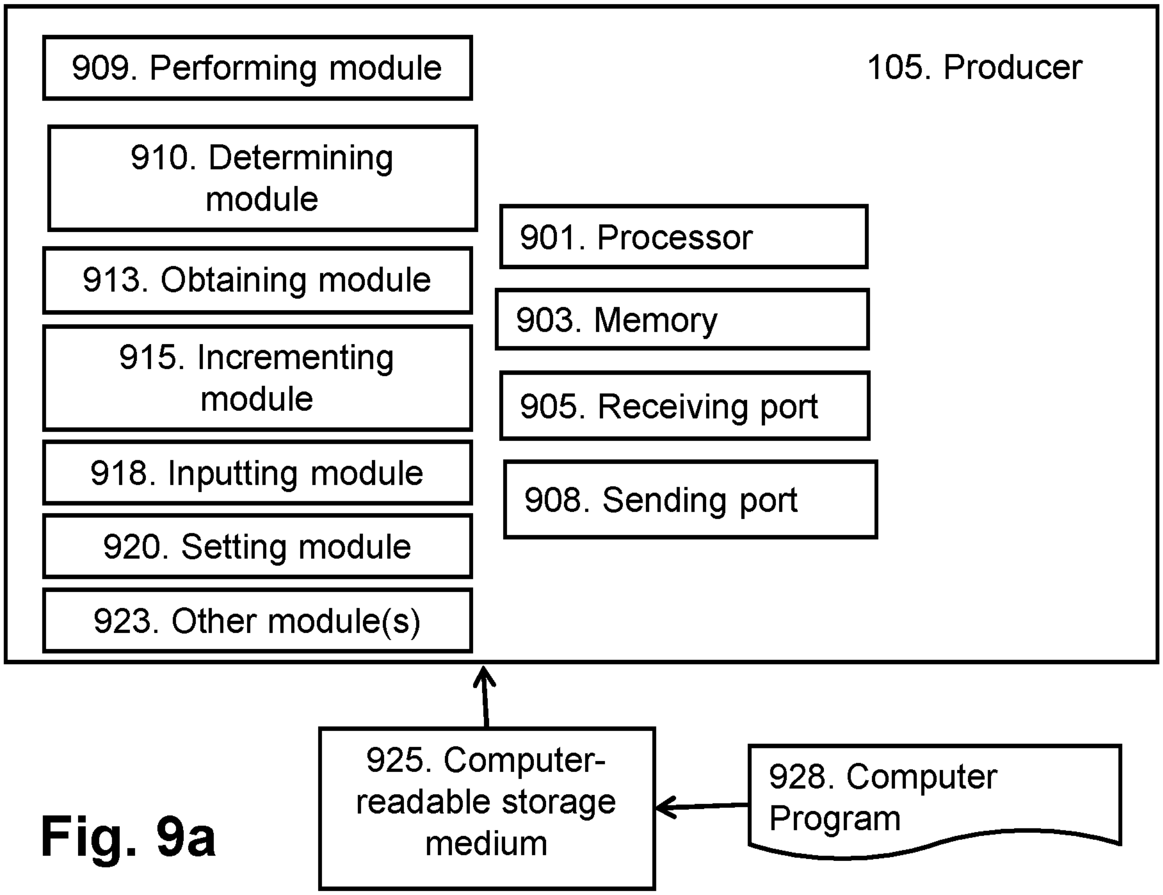
FIGS. 9*a* and 9*b* are schematic diagrams illustrating a producer.
Figure 9B:
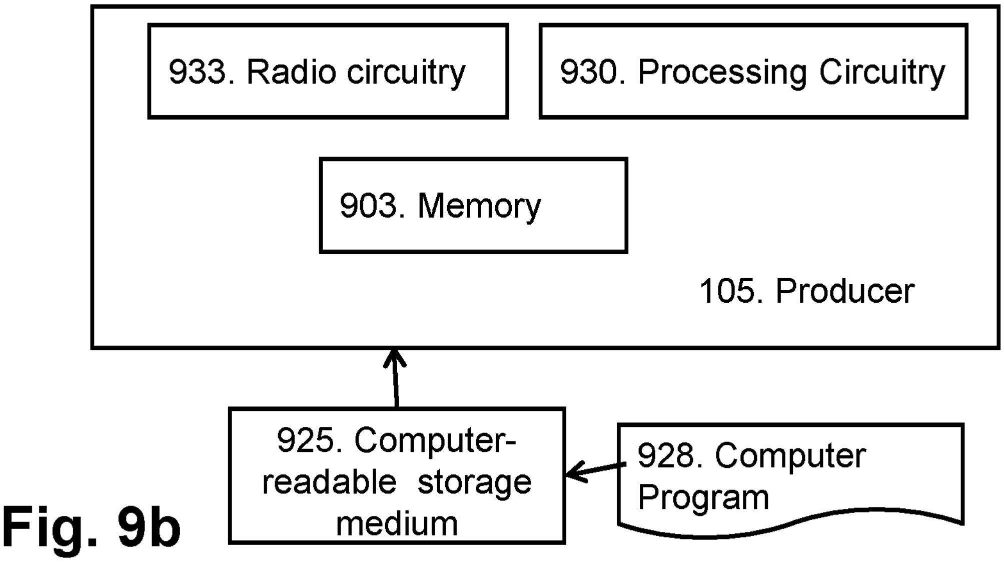

To perform the method steps shown in FIG. 7 for inputting data items in a ring buffer 100 the producer 105 may comprise an arrangement as shown in FIG. 9*a* and/or FIG. 9*b*. FIG. 9*a* and FIG. 9*b* depict two different examples in panels a) and b), respectively, of the arrangement that the producer 105 may comprise. The producer 105 may comprise the following arrangement depicted in FIG. 9*a*.

The present mechanism for inputting data items in a ring buffer 100 may be implemented through one or more processors, such as a processor 901 in the arrangement depicted in FIG. 9*a*, together with computer program code for performing the functions described herein. The processor may be for example a DSP, ASIC processor, FPGA processor or microprocessor. The program code mentioned above may also be provided as a computer program product, for instance in the form of a data carrier carrying computer program code for performing the present disclosure herein when being loaded into the producer 105. One such carrier may be in the form of a CD ROM. It is however feasible with other data carriers such as a memory stick. The computer program code can be provided as pure program code on a server and downloaded to the producer 105.

The producer 105 may comprise a memory 903 comprising one or more memory units. The memory 903 is arranged to be used to store obtained information, store data, configurations, schedulings, and applications etc. to perform the methods herein when being executed in the producer 105.

The producer 105 may receive information from, e.g. the consumer 108, through a receiving port 905. The producer 105 may receive information from another structure in the system 600 through the receiving port 905. Since the receiving port 905 may be in communication with the processor 901, the receiving port 905 may then send the received information to the processor 901. The receiving port 905 may also be configured to receive other information.

The processor 901 in the producer 105 may be configured to transmit or send information to another structure in the system 600, through a sending port 908, which may be in communication with the processor 901, and the memory 903.

The producer 105 may comprise a performing module 909, a determining module 910, an obtaining module 913, an incrementing module 915, an inputting module 918, a setting module 920, and other module(s) 923 etc.

Those skilled in the art will also appreciate that the performing module 909, the determining module 910, the obtaining module 913, the determining module 910, the obtaining module 913, the incrementing module 915, the inputting module 918, the setting module 920, and the other module(s) 923 etc. described above may refer to a combination of analogue and digital circuits, and/or one or more processors configured with software and/or firmware, e.g., stored in memory, that, when executed by the one or more processors such as the processor 901, perform as described above. One or more of these processors, as well as the other digital hardware, may be comprised in a single ASIC, or several processors and various digital hardware may be distributed among several separate components, whether individually packaged or assembled into a System-on-a-Chip (SoC).

The different units 909-923 described above may be implemented as one or more applications running on one or more processors such as the processor 901.

The producer 105 is adapted to, e.g. by means of the performing module 909 to perform an atomic operation comprising to obtain a sampled value (icnt_s) of the input counter (icnt) and to increment the sampled value (icnt_s) of the input counter (icnt).

The producer 105 is adapted to, e.g. by means of the determining module 910, determine an input position in the ring buffer 100. When one data item is to be inputted into the ring buffer 100, then the input position is determined to be the sampled value (icnt_s) of the input counter (icnt_s) modulo a size of the ring buffer 100. When multiple data items are to be inputted into the ring buffer 100, then the input position is determined to be the sampled value (icnt_s) of the input counter (icnt_s) plus the index (i) modulo a size of the ring buffer 100.

The producer 105 is adapted to, e.g. by means of the inputting module 918, input the data item in the element 103 located at the determined input position.

The producer 105 is adapted to, e.g. by means of the determining module 910, determine if status of the element 103 located at the determined position indicates that the element 103 is free or occupied. The data item is inputted in the element 103 if the status indicates free. If the status indicates occupied, the producer 105 is adapted to repeat the determining if status of the element 103 located at the determined position is free or occupied, until the status indicates free.

The producer 105 is adapted to, e.g. by means of the setting module 920, after the data item has been inputted, set the status of the element 103 to occupied.

The input counter may be incremented by a number which corresponds to a number of elements 103 in which a data item is to be inputted.

There may be one or multiple data items to be inputted into the ring buffer 100.

There may be multiple data items to be inputted into the ring buffer 100 by the producer 105.

When multiple data items are to be inputted into the ring buffer 100, then the producer 105 is adapted to, e.g. by means of the setting module 920, set an index (i) to zero prior to inputting the first data item into the ring buffer 100.

When multiple data items are to be inputted into the ring buffer 100, then the producer 105 is adapted to, e.g. by means of the incrementing module 915, after the first data item has been inputted, increment the index with one after each of the data items has been inputted into the ring buffer 100.

When multiple data items are to be inputted into the ring buffer 100, then the producer 105 is adapted to, e.g. by means of the determining module 910, after each data item has been inputted into the ring buffer 100, compare the index with the number of data items to be inputted.

When multiple data items are to be inputted into the ring buffer 100, then the producer 105 is adapted to, e.g. by means of processor 901, if the index is lower than the number of data items to be inputted, handle the next data item.

When multiple data items are to be inputted into the ring buffer 100, then the producer 105 is adapted to, e.g. by means of the determining module 910, if the index is not lower, determine that all data items have been inputted into the ring buffer 100.

The producer 105 may be adapted to, e.g. by means of the determining module 910, determine that multiple elements 103 at consecutive positions have a status which indicates that they are free.

The multiple data items may be inputted into the multiple elements 103 in parallel. The index may be incremented in accordance with the multiple data items.

The input counter (icnt) may be an atomic unsigned integer and counting upwards.

The number of elements 103 comprised in the ring buffer 100 may be fixed and larger than one. The elements 103 comprised in the ring buffer 100 may be equally sized.

Thus, the methods described herein for the producer 105 may be respectively implemented by means of a computer program 925 product, comprising instructions, i.e., software code portions, which, when executed on at least one processor 901, cause the at least one processor 1001 to carry out the actions described herein, as performed by the producer 105. The computer program 925 product may be stored on a computer-readable storage medium 928. The computer-readable storage medium 928, having stored thereon the computer program 925, may comprise instructions which, when executed on at least one processor 901, cause the at least one processor 901 to carry out the actions described herein, as performed by the producer 105. The computer-readable storage medium 925 may be a non-transitory computer-readable storage medium, such as a CD ROM disc, or a memory stick. The computer program 928 product may be stored on a carrier containing the computer program 928 just described, wherein the carrier is one of an electronic signal, optical signal, radio signal, or the first computer-readable storage medium 925, as described above.

The producer 105 may comprise a communication interface configured to facilitate communications between the producer 105 and other nodes or devices, e.g., the consumer 108, or another structure. The interface may comprise a transceiver configured to transmit and receive signals over an interface in accordance with a suitable standard.

The producer 105 may comprise the following arrangement depicted in FIG. 9*b*. The producer 105 may comprise a processing circuitry 930, e.g., one or more processors such as the processor 901, in the producer 105 and the memory 903. The producer 105 may also comprise a radio circuitry 933, which may comprise e.g., the receiving port 905 and the sending port 908. The processing circuitry 930 may be configured to, or operable to, perform the method actions according to FIGS. 2-5 and 7, in a similar manner as that described in relation to FIG. 9*a*. The radio circuitry 933 may be configured to set up and maintain at least a wireless connection with the producer 105. Circuitry may be understood herein as a hardware component.

Hence, the present disclosure also relates to the producer 105 operative to operate in the system 600. The producer 105 may comprise the processing circuitry 930 and the memory 903. The memory 903 comprises instructions executable by said processing circuitry 930. The producer 105 is operative to perform the actions described herein in relation to the producer 105, e.g., in FIGS. 2-5 and 7.

A computer program may comprise instructions which, when executed on at least one processor, e.g. the processor 901 or the processing circuitry 930, cause the at least one processor to carry out the method as described in any of FIGS. 2-5 and 7. A carrier may comprise the computer program, and the carrier may be one of an electronic signal, optical signal, radio signal or computer readable storage medium.

Figure 10A:
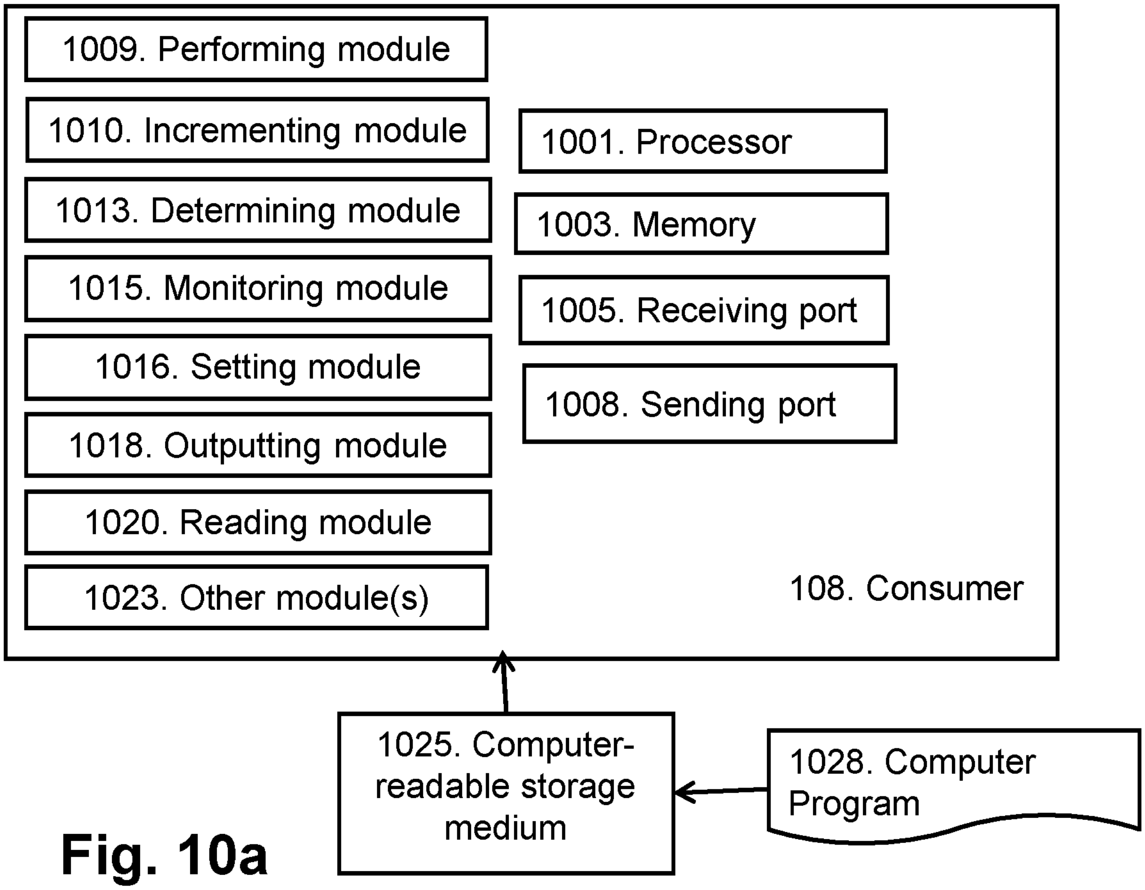
Figure 10B:
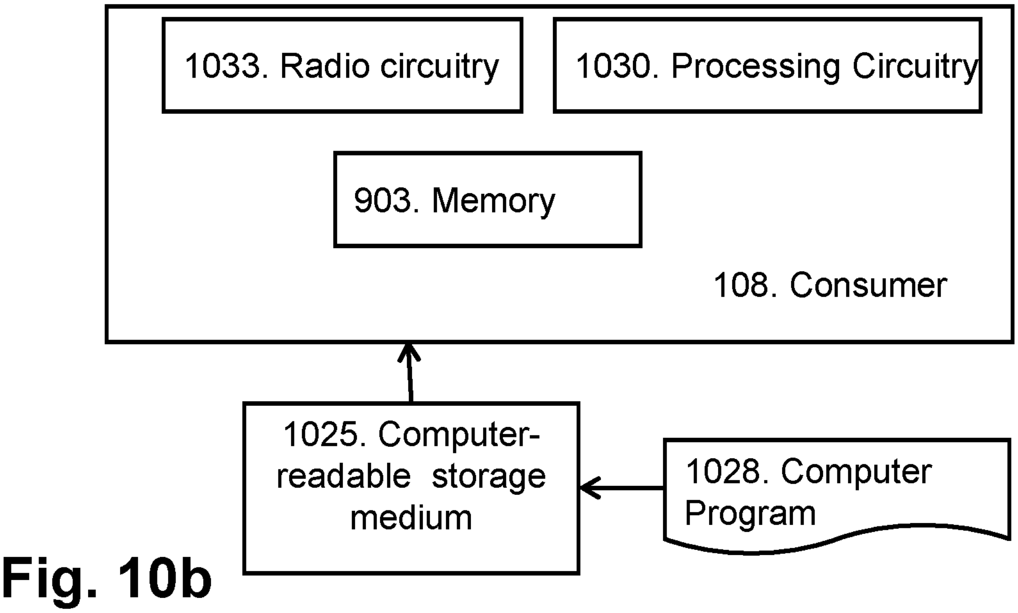

To perform the method steps shown in FIG. 8 for outputting data items from a ring buffer 100, the consumer 108 may comprise an arrangement as shown in FIG. 10*a* and/or FIG. 10*b*. FIG. 10*a* and FIG. 10*b* depict two different examples in panels a) and b), respectively, of the arrangement that the consumer 108 may comprise. The consumer 108 may comprise the following arrangement depicted in FIG. 10*a*.

The present disclosure associated with the consumer 108 may be implemented through one or more processors, such as a processor 1001 in the consumer 108 depicted in FIG. 10*a*, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the consumer 108. One such carrier may be in the form of a CD ROM disc. It is however feasible with other data carriers such as a memory stick. The computer program code may be provided as pure program code on a server and downloaded to the consumer 108.

The consumer 108 may comprise a memory 1003 comprising one or more memory units. The memory 1003 is arranged to be used to store obtained information, store data, configurations, schedulings, and applications etc. to perform the methods herein when being executed in the consumer 108.

The consumer 108 may receive information from, e.g., the producer 105, through a receiving port 1005. The consumer 108 may receive information from another structure in the system 600 through the receiving port 1005. Since the receiving port 1005 may be in communication with the processor 1001, the receiving port 1005 may then send the received information to the processor 1001. The receiving port 1005 may also be configured to receive other information.

The processor 1001 in the consumer 108 may be configured to transmit or send information to e.g., the producer 105, or another structure in the system 600, through a sending port 1008, which may be in communication with the processor 1001, and the memory 1003.

The consumer 108 may comprise a performing module 1009, an incrementing module 1010, a determining module 1013, a monitoring module 1015, a setting module 1016, an outputting module 1018, a reading module 1020, other module(s) 1023 etc.

Those skilled in the art will also appreciate that the performing module 1009, the incrementing module 1010, the determining module 1013, the monitoring module 1015, the setting module 1016, the outputting module 1018, the reading module 1020, other module(s) 1023 etc. described above may refer to a combination of analog and digital circuits, and/or one or more processors configured with software and/or firmware, e.g., stored in memory, that, when executed by the one or more processors such as the processor 1001, perform as described above. One or more of these processors, as well as the other digital hardware, may be comprised in a single ASIC, or several processors and various digital hardware may be distributed among several separate components, whether individually packaged or assembled into a SoC.

Also, the different units 1009-1023 described above may be implemented as one or more applications running on one or more processors such as the processor 10001.

The consumer 108 is adapted to, e.g. by means of the performing module 1009, perform an atomic operation comprising to obtain a sampled value (ocnt_s) of the output counter (ocnt) and to increment the output counter (ocnt).

The consumer 108 is adapted to, e.g. by means of the determining module 1013, determine an output position in the ring buffer 100 to be the sampled value (ocnt_s) of the output counter (ocnt) modulo a size of the ring buffer 100. The output position is unique for the consumer 108.

The consumer 108 is adapted to, e.g. by means of the monitoring module 1015, monitor a status of the element 103 at the output position, wherein the status indicates that the element 103 is free or occupied.

The consumer 108 is adapted to, e.g. by means of the monitoring module 1015, if the status indicates free, continue monitoring the status of the element 103 until the status of indicates occupied.

The consumer 108 is adapted to, e.g. by means of the determining module 1013, if the status indicates occupied, determine that the element 103 has been validly read at the output position.

The consumer 108 is adapted to, e.g. by means of the setting module 1016, after it has been determined that the element 103 has been validly read, set the status of the element 103 to free.

The consumer 108 is adapted to, e.g. by means of the outputting module 1018, output the data item from the element 103 which has been validly read and located at the output position.

The consumer 108 may be adapted to, e.g. by means of the reading module 1020, read the element 103 located at the output position. The status may be comprised in the element 103.

The consumer 108 may be adapted to, e.g. by means of the determining module 1013, determine to output a data item from the ring buffer 100.

The output counter (ocnt) may be an atomic unsigned integer and counting upwards.

The number of elements 103 comprised in the ring buffer 100 may be equal to or greater than a number of consumers 108 that concurrently outputs data items from elements 103 in the ring buffer 100.

The number of elements 103 comprised in the ring buffer 100 may be fixed and larger than one. The elements 103 comprised in the ring buffer 100 may be equally sized.

Thus, the methods described herein for the consumer 108 may be respectively implemented by means of a computer program 1028 product, comprising instructions, i.e., software code portions, which, when executed on at least one processor 1001, cause the at least one processor 1001 to carry out the actions described herein, as performed by the consumer 108. The computer program 1028 product may be stored on a computer-readable storage medium 1025. The computer-readable storage medium 1025, having stored thereon the computer program 1028, may comprise instructions which, when executed on at least one processor 1001, cause the at least one processor 1001 to carry out the actions described herein, as performed by the consumer 108. The computer-readable storage medium 1025 may be a non-transitory computer-readable storage medium, such as a CD ROM disc, or a memory stick. The computer program 1028 product may be stored on a carrier containing the computer program 1028 just described, wherein the carrier is one of an electronic signal, optical signal, radio signal, or the second computer-readable storage medium 1025, as described above.

The consumer 108 may comprise a communication interface configured to facilitate communications between the consumer 108 and other nodes or devices, e.g., the producer 105, or another structure. The interface may, for example, comprise a transceiver configured to transmit and receive signals over an interface in accordance with a suitable standard.

The consumer 108 may comprise the following arrangement depicted in FIG. 10*b*. The consumer 108 may comprise a processing circuitry 1030, e.g., one or more processors such as the processor 1001, in the consumer 108 and the memory 1003. The consumer 108 may also comprise a radio circuitry 1033, which may comprise e.g., the receiving port 1005 and the sending port 1008. The processing circuitry 1030 may be configured to, or operable to, perform the method actions according to FIGS. 2-7 and 8 in a similar manner as that described in relation to FIG. 10*a*. The radio circuitry 1033 may be configured to set up and maintain at least a wireless connection with the consumer 108. Circuitry may be understood herein as a hardware component.

The consumer 108 may be operative to operate in the system 600. The consumer 108 may comprise the processing circuitry 1030 and the memory 1003. The memory 1003 comprises instructions executable by the processing circuitry 1030. The consumer 108 is operative to perform the actions described herein in relation to the consumer 108, e.g., in FIGS. 2-5 and 8.

A computer program may comprise instructions which, when executed on at least one processor, e.g. the processor 1001 or the processing circuitry 1030, cause the at least one processor to carry out the method as described in any of FIGS. 2-5 and 8. A carrier may comprise the computer program, and the carrier may be one of an electronic signal, optical signal, radio signal or computer readable storage medium.

As mentioned earlier, the system 600 may comprise at least one producer 105 and at least one consumer 108 for inputting and outputting data items into and from a ring buffer 100. The at least one producer 105 is adapted to carry out the method as described in any of FIGS. 2-5 and 7, and the at least one consumer 108 is adapted to carry out the method as described in any of FIGS. 2-5 and 8.

The present disclosure may be implemented by hardwired circuitry or by software, or by hardwired circuitry in combination with software.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The present disclosure is not limited to the above. Various alternatives, modifications and equivalents may be used. Therefore, disclosure herein should not be taken as limiting the scope. A feature may be combined with one or more other features.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

The invention claimed is:

1. A method performed by a producer processor for inputting data items in a ring buffer of a data processing system, wherein the ring buffer comprises a number of elements and is associated with an input counter (icnt) and with an output counter (ocnt) usable to determine respective output positions unique to each consumer of data items from the ring buffer, wherein the method comprises:

- performing an atomic operation comprising obtaining a sampled value (icnt_s) of the input counter (icnt) and incrementing the input counter (icnt);
- determining an input position in the ring buffer to be the sampled value (icnt_s) of the input counter (icnt) modulo a size of the ring buffer;
- determining whether a status of the element located at the input position indicates that the element is free or occupied;
- based on determining the status indicates free, inputting a data item in the element located at the input position and, after the data item has been inputted, setting the status of the element to occupied; and
- based on determining the status indicates occupied, repeating the determining of whether the status of the element located at the input position is free or occupied until the status indicates free.

2. A method performed by a producer processor for inputting multiple data items into a ring buffer of a data processing system, wherein the ring buffer comprises a number of elements and is associated with an input counter (icnt) and with an output counter (ocnt) usable to determine respective output positions unique to each consumer of data items from the ring buffer, wherein the method comprises:

- performing an atomic operation comprising obtaining a sampled value (icnt_s) of the input counter (icnt) and incrementing the input counter (icnt) with a number of data items to insert (n);
- setting an index (i) to zero prior to inputting a first data item into the ring buffer;
- determining an input position in the ring buffer to be the sampled value (icnt_s) of the input counter (icnt) plus the index (i) modulo a size of the ring buffer;
- determining whether a status of the element located at the input position indicates that the element is free or occupied;
- based on determining the status indicates free, inputting a data item in the element located at the input position and, after the data item has been inputted, setting the status of the element to occupied;
- based on determining the status indicates occupied, repeating the determining of whether the status of the element located at the input position is free or occupied until the status indicates free;
- after the first data item has been inputted, incrementing the index (i) with one after each of the data items have been inputted into the ring buffer;
- after each data item has been inputted into the ring buffer, comparing the index (i) with the number of data items to be inputted (n);
- when the comparison indicates the index (i) is lower than the number of data items to be inputted (n), handling the next data item; and
- when the comparison indicates the index (i) is not lower than the number of data items to be inputted (n), determining that all data items have been inputted into the ring buffer.

3. The method according to claim 2, further comprising determining that multiple elements at consecutive positions have a status which indicates that they are free, wherein:

- the multiple data items are inputted into the multiple elements in parallel, and
- the index (i) is incremented in accordance with the multiple data items.

4. A method performed by a consumer processor for outputting data items from a ring buffer in a data processing system, wherein the ring buffer comprises a number of elements and is associated with an output counter (ocnt) and with an input counter (icnt) usable for inputting the data items to the ring buffer, wherein the method comprises:

- performing an atomic operation comprising obtaining a sampled value (ocnt_s) of the output counter (ocnt) and incrementing the output counter (ocnt);
- determining an output position in the ring buffer to be the sampled value (ocnt_s) of the output counter (ocnt) modulo a size of the ring buffer, wherein the output position is unique for the consumer;
- monitoring whether a status of the element at the output position, indicates that the element is free or occupied;
- when the monitored status indicates free, continuing monitoring the status of the element until the status indicates occupied;
- when the monitored status indicates occupied, determining that the element has been validly read at the output position and subsequently setting the status of the element to free; and
- outputting the data item from the element which has been validly read and located at the output position.

5. The method according to claim 4, further comprising reading the element located at the output position, wherein the status is comprised in the element.

6. The method according to claim 4, wherein the number of elements comprised in the ring buffer is equal to or greater than a number of consumers that concurrently outputs data items from elements in the ring buffer.

7. A producer configured to input data items into a ring buffer of a data processing system, wherein the ring buffer comprises a number of elements and is associated with an input counter (icnt), wherein the producer comprises a processor that is operably coupled to the ring buffer, wherein the processor is configured to perform the method performed by the producer processor in claim 1.

8. A producer configured to input multiple data items into a ring buffer of a data processing system, wherein the ring buffer comprises a number of elements and is associated with an input counter (icnt) and with an output counter (ocnt) usable to determine respective output positions unique to each consumer of data items from the ring buffer, wherein the producer comprises a processor that is operably coupled to the ring buffer, wherein the processor is configured to:

perform an atomic operation comprising obtaining a sampled value (icnt_s) of the input counter (icnt) and incrementing the input counter (icnt) with a number of data items to insert (n);

set an index (i) to zero prior to inputting a first data item into the ring buffer;

determine an input position in the ring buffer to be the sampled value (icnt_s) of the input counter (icnt) plus the index (i) modulo a size of the ring buffer;

determine whether a status of the element located at the input position indicates that the element is free or occupied;

based on determining the status indicates free, input a data item in the element located at the input position and, after the data item has been inputted, set the status of the element to occupied;

based on determining the status indicates occupied, repeat the determination of whether the status of the element located at the input position is free or occupied until the status indicates free;

after the first data item has been inputted, increment the index (i) with one after each of the data items have been inputted into the ring buffer;

after each data item has been inputted into the ring buffer, compare the index (i) with the number of data items to be inputted (n);

when the comparison indicates the index (i) is lower than the number of data items to be inputted (n), handle the next data item; and when the comparison indicates the index (i) is not lower than the number of data items to be inputted (n), determine that all data items have been inputted into the ring buffer.

9. The producer according to claim 8, wherein the processor is further configured to determine that multiple elements at consecutive positions have a status which indicates that they are free, wherein:

the multiple data items are inputted into the multiple elements in parallel, and the index (i) is incremented in accordance with the multiple data items.

10. A consumer configured to output data items from a ring buffer in a data processing system, wherein the ring buffer comprises a number of elements and is associated with an output counter (ocnt) and with an input counter (icnt) usable for inputting the data items to the ring buffer, wherein the consumer comprises a processor that is operably coupled to the ring buffer, wherein the processor is configured to:

perform an atomic operation comprising obtaining a sampled value (ocnt_s) of the output counter (ocnt) and incrementing the output counter (ocnt);

determine an output position in the ring buffer to be the sampled value (ocnt_s) of the output counter (ocnt) modulo a size of the ring buffer, wherein the output position is unique for the consumer;

monitor whether a status of the element at the output position, indicates that the element is free or occupied;

when the monitored status indicates free, continue monitoring the status of the element until the status indicates occupied;

when the monitored status indicates occupied, determine that the element has been validly read at the output position and subsequently set the status of the element to free; and output the data item from the element which has been validly read and located at the output position.

11. The consumer according to claim 10, wherein the processor is further configured to read the element located at the output position, wherein the status is comprised in the element.

12. The consumer according to claim 10, wherein the number of elements comprised in the ring buffer is equal to or greater than a number of consumers that concurrently outputs data items from elements in the ring buffer.

13. A data processing system comprising:

a ring buffer comprising a number of elements, wherein the ring buffer is associated with an input counter (icnt) and an output counter (ocnt), at least one producer processor configured to input data items into the ring buffer, wherein each producer processor is further configured to perform the method of claim 1; and at least one consumer processor configured to output data items from the ring buffer, wherein each consumer processor is further configured to:

perform an atomic operation comprising obtaining a sampled value (ocnt_s) of the output counter (ocnt) and incrementing the output counter (ocnt);

determine an output position in the ring buffer to be the sampled value (ocnt_s) of the output counter (ocnt) modulo a size of the ring buffer, wherein the output position is unique for the consumer;

monitor whether a status of the element at the output position, indicates that the element is free or occupied;

when the monitored status indicates free, continue monitoring the status of the element until the status indicates occupied;

when the monitored status indicates occupied, determine that the element has been validly read at the output position and subsequently set the status of the element to free; and output the data item from the element which has been validly read and located at the output position.

14. A data processing system comprising:

a ring buffer comprising a number of elements, wherein the ring buffer is associated with an input counter (icnt) and an output counter (ocnt), at least one producer processor configured to input data items into the ring buffer, wherein each producer processor is further configured to perform the method of claim 2; and at least one consumer processor configured to output data items from the ring buffer, wherein each consumer processor is further configured to:

perform an atomic operation comprising obtaining a sampled value (ocnt_s) of the output counter (ocnt) and incrementing the output counter (ocnt);

determine an output position in the ring buffer to be the sampled value (ocnt_s) of the output counter (ocnt) modulo a size of the ring buffer, wherein the output position is unique for the consumer;

monitor whether a status of the element at the output position, indicates that the element is free or occupied;

when the monitored status indicates free, continue monitoring the status of the element until the status indicates occupied;

when the monitored status indicates occupied, determine that the element has been validly read at the output position and subsequently set the status of the element to free; and output the data item from the element which has been validly read and located at the output position.

15. A method performed by a data processing system configured to input data items into and output data items from a ring buffer associated with an input counter (icnt) and an output counter (ocnt), wherein the system comprises at least one producer processor and at least one consumer processor, wherein the ring buffer comprises a number of elements, wherein the method comprises:

by each producer processor, performing the method of claim 1; and by each consumer processor, the following operations:

performing an atomic operation comprising obtaining a sampled value (ocnt_s) of the output counter (ocnt) and incrementing the output counter (ocnt);

determining an output position in the ring buffer to be the sampled value (ocnt_s) of the output counter (ocnt) modulo a size of the ring buffer, wherein the output position is unique for the consumer;

monitoring whether a status of the element at the output position, indicates that the element is free or occupied;

when the monitored status indicates free, continuing monitoring the status of the element until the status indicates occupied;

when the monitored status indicates occupied, determining that the element has been validly read at the output position and subsequently setting the status of the element to free; and outputting the data item from the element which has been validly read and located at the output position.

16. A method performed by a data processing system configured to input data items into and output data items from a ring buffer associated with an input counter (icnt) and an output counter (ocnt), wherein the system comprises at least one producer processor and at least one consumer processor, wherein the ring buffer comprises a number of elements, wherein the method comprises:

by each producer processor, performing the method of claim 2; and by each consumer processor, the following operations:

performing an atomic operation comprising obtaining a sampled value (ocnt_s) of the output counter (ocnt) and incrementing the output counter (ocnt);

determining an output position in the ring buffer to be the sampled value (ocnt_s) of the output counter (ocnt) modulo a size of the ring buffer, wherein the output position is unique for the consumer;

monitoring whether a status of the element at the output position, indicates that the element is free or occupied;

when the monitored status indicates free, continuing monitoring the status of the element until the status indicates occupied;

when the monitored status indicates occupied, determining that the element has been validly read at the output position and subsequently setting the status of the element to free; and outputting the data item from the element which has been validly read and located at the output position.

17. A non-transitory, computer-readable medium storing computer-executable instructions that, when executed by processing circuitry, cause the method of claim 1 for inputting data items into the ring buffer of the data processing system to be performed by the producer processor.

18. A non-transitory, computer-readable medium storing computer-executable instructions that, when executed by processing circuitry, cause the method of claim 2 for inputting data items into the ring buffer of the data processing system to be performed by the producer processor.

19. A non-transitory, computer-readable medium storing computer-executable instructions that, when executed by processing circuitry, cause the method of claim 4 for outputting data items from the ring buffer of the data processing system to be performed by the consumer processor.

* * * * *